US008570396B2

(12) United States Patent
Rapaport

(10) Patent No.: US 8,570,396 B2
(45) Date of Patent: Oct. 29, 2013

(54) MULTIPLE EXPOSURE HIGH DYNAMIC RANGE IMAGE CAPTURE

(75) Inventor: Guy Rapaport, Haifa (IL)

(73) Assignee: CSR Technology Inc., Sunnyvale, CA (US)

( * ) Notice: Subject to any disclaimer, the term of this patent is extended or adjusted under 35 U.S.C. 154(b) by 155 days.

(21) Appl. No.: 13/091,068

(22) Filed: Apr. 20, 2011

(65) Prior Publication Data

US 2011/0211732 A1    Sep. 1, 2011

Related U.S. Application Data

(63) Continuation-in-part of application No. 12/763,693, filed on Apr. 20, 2010, now Pat. No. 8,237,813.

(60) Provisional application No. 61/326,769, filed on Apr. 22, 2010, provisional application No. 61/171,936, filed on Apr. 23, 2009.

(51) Int. Cl.
*H04N 5/235* (2006.01)
*H04N 5/238* (2006.01)
*G06K 9/40* (2006.01)

(52) U.S. Cl.
USPC ......... 348/229.1; 348/364; 348/234; 382/274

(58) Field of Classification Search
USPC .......... 382/274, 224, 232; 348/234–238, 364, 348/365, 229.1
See application file for complete search history.

(56) References Cited

U.S. PATENT DOCUMENTS

| | | | |
|---|---|---|---|
| 5,194,960 A | 3/1993 | Ota | |
| 5,801,773 A | 9/1998 | Ikeda | |
| 5,828,793 A | 10/1998 | Mann | |
| 6,177,958 B1 | 1/2001 | Anderson | |
| 6,204,881 B1 | 3/2001 | Ikeda et al. | |

(Continued)

FOREIGN PATENT DOCUMENTS

WO    2010/123923 A1    10/2010

OTHER PUBLICATIONS

Zhengguo Li; Rahardja, S.; Zijian Zhu; Shoulie Xie; Shiclian Wu; , "Movement detection for the synthesis of high dynamic range images," Image Processing (ICIP), 2010 17th IEEE International Conference on , vol., no., pp. 3133-3136, Sep. 26-29, 2010; doi: 10.1109/ICIP.2010.5654076.*

(Continued)

*Primary Examiner* — Tuan Ho
*Assistant Examiner* — Shahbaz Nazrul
(74) *Attorney, Agent, or Firm* — Frommer Lawrence & Haug LLP; John W. Branch

(57) ABSTRACT

Techniques for creating a High Dynamic Range (HDR) image within a consumer grade digital camera from a series of images of a scene captured at different exposure levels, and displaying the HDR image on the camera's built-in display are provided. The approach employs mixing images of the series to incorporate both scene shadow and highlight details, and the removing of "ghost" image artifacts appearing in the mixed HDR image resulting from movement in the scene over the time the series images are captured. The low computational resource utilization of the image mixing and ghost removal processing operations, along with the ability to commence image mixing and ghost removal prior to the acquisition of all series images, can significantly reduce the time required to generate and display a tone mapped HDR image.

8 Claims, 21 Drawing Sheets

(56) References Cited

U.S. PATENT DOCUMENTS

| | | | |
|---|---|---|---|
| 6,720,993 | B1 | 4/2004 | Hwang et al. |
| 7,317,844 | B1 | 1/2008 | Horne |
| 7,403,707 | B2 | 7/2008 | Raskar et al. |
| 7,948,538 | B2 | 5/2011 | Asoma |
| 8,106,967 | B2 | 1/2012 | Tsuchiya |
| 8,228,392 | B2 | 7/2012 | Siddiqui et al. |
| 2003/0117412 | A1 | 6/2003 | Brooksby et al. |
| 2004/0095472 | A1 | 5/2004 | Yoshida et al. |
| 2005/0013501 | A1 | 1/2005 | Kang et al. |
| 2005/0030315 | A1 | 2/2005 | Cohen et al. |
| 2006/0133688 | A1 | 6/2006 | Kang et al. |
| 2007/0242900 | A1 | 10/2007 | Chen et al. |
| 2008/0043114 | A1 | 2/2008 | Sung et al. |
| 2008/0094486 | A1 | 4/2008 | Fuh et al. |
| 2008/0284872 | A1 | 11/2008 | Asoma |
| 2009/0046947 | A1 | 2/2009 | Kobayashi |
| 2009/0060315 | A1 | 3/2009 | Harris et al. |
| 2010/0157078 | A1 | 6/2010 | Atanassov et al. |
| 2010/0232726 | A1 | 9/2010 | Liu |
| 2010/0259636 | A1 | 10/2010 | Tzur |
| 2010/0271512 | A1 | 10/2010 | Garten |
| 2011/0254976 | A1 | 10/2011 | Garten |
| 2012/0218442 | A1* | 8/2012 | Jandhyala et al. ............ 348/239 |
| 2012/0288217 | A1* | 11/2012 | Zhai et al. .................... 382/294 |
| 2012/0293685 | A1 | 11/2012 | Garten |

OTHER PUBLICATIONS

Extended European Search Report in European Patent Application No. 12164871 mailed Sep. 17, 2012.
Li et al., "Movement Detection for the Synthesis of High Dynamic Range Images," Proceedings of 2010 IEEE 17th International Conference on Image Processing, Sep. 26-29, 2010, Hong Kong, pp. 3133-3136, XP031815216.
Grosh, T., "Fast and Robust High Dynamic Range Image Generation with Camera and Object Movement," Vision, Modeling, and Visualizaton 2006: Proceedings, Nov. 22-24, 2006, Aachen, Germany, IOS Press, 9 pages, XP002612400.
Gallo, O. et al., "Artifact-free High Dynammic Range Imaging," 2009 IEEE International Conference on Computational Photography (ICCP 2009), IEEE, US, Apr. 16, 2009, 7 pages, XP002612399.
Official Communication for U.S. Appl. No. 13/090,985 mailed Jan. 3, 2013.
Official Communication for U.S. Appl. No. 12/756,035 mailed Jul. 23, 2012.
Official Communication for U.S. Appl. No. 12/756,035 mailed Oct. 1, 2012.
Search Report in GB Patent Application No. 1206833.4 dated Dec. 18, 2012.
International Search Report and Written Opinion for International Patent Application No. PCT/US2010/030301 dated Jul. 2, 2010.
Official Communication for U.S. Appl. No. 12/756,035 mailed Mar. 6, 2012.
International Search Report and Written Opinion in International Application No. PCT/US2010/031780, dated Jun. 11 2010.
Reinhard, Erik et al. "High Dynamic Range Imaging Acquisition, Display, and Image-Based Lighting", The Morgan Kaufmann Series in computer Graphics and Geometric Modeling, 2005, Chapter 4, pp. 115-165, Morgan Kaufmann Publishers, San Francisco CA.
Kang, Sing Bing et al. "High Dynamic Range Video", Interactive Visual Media Group, Microsoft Research, pp. 1-7, Redmond WA.
Web page wiki-panotools.org/Enfuse, pp. 1-8, last modified on Jan. 30, 2010 at 13:18.
Web page "Bounding Containers for Polygons, Polyhedra, and Point Sets (2D & 3D)", at softsurfer.com/Archive/algorithm_0107/algo-rithm_0107.htm.
Search Report issued by the United Kingdom Intellectual Property Office on Aug. 16, 2012 in related UK Patent Application No. GB 1206833.4.
Official Communication for U.S. Appl. No. 13/090,965 mailed Sep. 11, 2012.
Official Communication for U.S. Appl. No. 12/756,035 mailed Feb. 8, 2013.
Official Communication for U.S. Appl. No. 12/763,693 mailed Mar. 29, 2012.
Official Communication for U.S. Appl. No. 13/090,985 mailed Mar. 29, 2013.
Official Communication for U.S. Appl. No. 12/756,035 mailed Jul. 16, 2013.
Mertens, T. et al., "Exposure Fusion," 15th Pacific Conference on Computer Graphics and Applications, Oct. 29, 2007-Nov. 2, 2007, pp. 382-390.
Rövid, A. et al., "Gradient Based Synthesized Multiple Exposure Time HDR Image," Instrumentation and Measurement Technology Conference Proceedings, 2007, IMTC 2007, May 1-3, 2007, pp. 1-6.
Official Communication for U.S. Appl. No. 13/569,118 mailed Aug. 30, 2013.

* cited by examiner

MULTIPLE EXPOSURE HIGH DYNAMIC RANGE IMAGE CAPTURE

CROSS-REFERENCE TO RELATED APPLICATIONS

This application claims priority under 35 U.S.C. 119(e) from U.S. Provisional Application Ser. No. 61/326,769 entitled "Multiple Exposure High Dynamic Range Image Capture" filed on Apr. 22, 2010, and is a continuation-in-part of U.S. patent application Ser. No. 12/763,693 entitled "Multiple Exposure High Dynamic Range Image Capture" filed on Apr. 20, 2010 which claims priority from U.S. Provisional Application Ser. No. 61/171,936 entitled "HDR From Multiple Exposures" filed on Apr. 23, 2009. All applications cited above are expressly incorporated by reference in their entirety.

BACKGROUND OF THE INVENTION

1. Field of the Invention

This application relates to the acquisition and processing of images that display the full range of gray shades that appear in a physical scene, often referred to as a "High Dynamic Range" or "HDR" image. More particularly it relates to a system and method for the image capture and processing of a HDR image in a digital image capture device such as a consumer grade digital camera.

2. Discussion of Related Art

Images captured by digital cameras are most commonly Low Dynamic Range (LDR) images, in which each image pixel comprises a limited number of digital bits per color. The number of digital bits per pixel is called the digital pixel bit width value. This number is commonly 8 bits. Such 8-bit pixels can be used to form an image with 256 different gray levels for each color at each pixel location. In a LDR image of a scene, shadow areas of the scene are depicted as being completely black (black saturation), bright sunlit areas of the scene are depicted as being completely white (white saturation), and scene areas in between are shown in a range of gray shades. A High Dynamic Range (HDR) image is one that has digital pixel bit width values of greater than 8 bits; 16 bits per pixel is a possible value. In such an image the full range of gray shades that appear in a physical scene can be displayed. These gray shades provide image details that are present in the scene's shadow regions, highlight regions and mid tone regions that are missing from the LDR image. Thus, in an HDR image, scene details are present in image dark areas that are in shadow due to their proximity next to tall buildings and beneath trees, in light areas directly illuminated by bright sunlight, as well as in mid-illumination areas that are lighted between these two extremes.

An HDR image can be captured by acquiring multiple LDR images of a scene that are captured at different exposure levels. These multiple LDR images are called a bracketed exposed image series. A low exposure level will properly capture the gray shades in scene areas fully illuminated by bright sunlight and a high exposure level will properly capture the gray shades in scene areas completely shielded from the sun and sky by buildings and trees. However, at the low exposure level the areas of the scene in shadow will be completely black, in black saturation, and show no detail, and the mid-tone areas will lose detail. Further, at the high exposure level, the highlights of the scene will be completely white, in white saturation, and show no detail, and the mid-tone areas will again lose detail. Thus, a third, mid exposure level image, which properly captures mid level gray shades, is often acquired as well. By mixing these three LDR images, an HDR image can be generated that depicts the full gray scale range of the scene.

Deriving a HDR image from a bracketed exposed image series currently requires a complex implementation that employs an expensive computational engine. This is due to the need to perform three separate processing operations to properly mix the bracketed exposed image series into a single HDR image, and a fourth to convert the resulting image, which is now composed of pixels with digital pixel bit width values of greater than 8 bits per color, into one that can be displayed on commonly available 8 bit per pixel per color displays. These four processing operations are:

"Image Registration" for accurately aligning the multiple images one to another;

"Image Mixing" for blending the multiple images together with the proper weighting;

"Ghost Removal" for removing location shifted replications of scene objects, or "ghosts", that would appear in the mixed HDR image, due to the movement of these objects over the time the multiple images were acquired; and "Tone Mapping" for preparing the final HDR image for presentation on conventional displays that are limited to displaying 8 bit per pixel per color image pixels.

Executing these four processing operations requires the performance of a large number of floating point operations over a short period of time, as can be seen from a review of "High Dynamic Range Imaging Acquisition, Display, and Image-Based Lighting", by authors Erik Reinhard, Sumanta Pattanaik, Greg Ward and Paul Debevec, published by Morgan Kaufmann Publishers, copyright 2005 by Elsevier, Inc. This is especially the case for the image mixing and ghost removal processing operations. Thus, powerful and expensive computational engines (Central Processing Units or CPUs) need to be used. Their expense can possibly be tolerated for professional digital camera use, but for inexpensive "Point and Shoot" digital cameras, which incorporate limited processing power CPUs, they represent an impractical solution.

An HDR image can be created from a bracketed exposed image series captured by an inexpensive digital camera by uploading the image series from the camera to a general purpose computer, such as Personal Computer (PC). An image processing application, such as Adobe Photoshop, can be used to perform the required complex HDR image combining process on a desktop. This approach is not efficient or convenient and does not meet demands to reconstruct an HDR image on the camera's built-in display shortly after its capture.

Thus there exists a need for an in-camera method and apparatus that can rapidly create a HDR image from a bracketed exposed image series, and display it on the camera's built-in display shortly after capture, using a limited processing power CPU.

SUMMARY OF THE INVENTION

Systems, methods, and computer program products for creating a high dynamic range composite image from multiple exposures are disclosed.

Embodiments of the invention may detect local motion between a reference image and a plurality of comparison images, cluster relevant pixels into patches, select a replacement image from a plurality of candidate replacement images as a source for replacement patch image data, replace patch image data in a composite image, and convert images from an initial format to a lower bits-per-pixel format for display.

The invention may be embodied as a method of mixing a plurality of digital images of a scene, including capturing the images at different exposure levels, registering counterpart pixels of each image to one another, deriving a normalized image exposure level for each image, and employing the normalized image exposure levels in an image blending process. The image blending process includes using the image blending process to blend a first selected image and a second selected image to generate an intermediate image, and when the plurality is composed of two images, outputting the intermediate image as a mixed output image. When the plurality is composed of more than two images, the image blending process includes repeating the image blending process using the previously generated intermediate image in place of the first selected image and another selected image in place of the second selected image until all images have been blended, and outputting the last generated intermediate image as the mixed output image.

The method may also include selectively converting the images from a lower bits-per-pixel format to a higher bits-per-pixel format prior to using image the blending process, and then selectively converting the mixed output image to a predetermined lower bits-per-pixel format.

The image blending process blends the counterpart pixels of two images and includes deriving a luma value for a pixel in the second selected image, using the luma value of a second selected image pixel as an index into a look-up table to obtain a weighting value between the numbers zero and unity, using the weighting value, the normalized exposure level of the second selected image, and the second selected image pixel to generate a processed second selected image pixel, selecting a first selected image pixel that corresponds to the second selected image pixel, using the first selected image pixel and the result of subtracting the weighting value from unity to generate a processed first selected image pixel, adding the processed first selected image pixel to the counterpart processed second selected image pixel to generate a blended image pixel, and repeating the above processing sequence until each second selected image pixel has been blended with its counterpart first selected image pixel.

The method may include the feature that the obtained weighting value decreases as the luma value used as the index into the look-up table increases. The method may also include using a different look-up table for each image for obtaining the weighting value. The method may also commence the image mixing prior to the capture of all the images of the plurality. The method may also commence the image mixing immediately after the capture of the second image of the plurality.

The embodiments further include a method of removing location shifted replications of scene objects appearing in a mixed image generated by a digital image mixing process applied to a plurality of images acquired at different exposure levels and different times, with the images having their counterpart pixels registered to one another. The method includes normalizing luma values of the images to a specific standard deviation and mean, detecting local motion between at least one reference image and at least one comparison image, clustering comparison image pixels having local motion into patches, selecting corresponding patches from the reference image, generating a binary connected image by logically ORing the patches generated from particular reference images together, and blending the mixed image with the reference images, with each reference image weighted by a weighting value computed from the binary connected image, to produce an output image.

The method may detect local motion by determining an absolute luma variance between each pixel of the reference image and the comparison image to produce a difference image, and identifying difference image regions having absolute luma variances exceeding a threshold. The clustering may include finding sets of connected identified image blobs using morphological operations, and bounding each set by a polygon. The selected images used as reference images may include the image with the lowest exposure level, the image with the highest exposure level, or any images with intermediate exposure levels. The images to be processed may be downscaled in luma value before processing.

One embodiment selects reference images by, for a candidate reference image of intermediate exposure value, calculating a sum of areas of saturated regions and a ratio of the sum of saturated areas to total patch areas, selecting the candidate reference image as the reference image when the ratio is less than or equal to a parameter value, for example 0.03 to 1, and selecting an image of less than intermediate exposure value as the reference image when the ratio is greater than the parameter value The invention may also be embodied as an image capturing device that captures a plurality of digital images of a scene at different exposure levels, comprising an image registration processor that registers counterpart pixels of each image of the plurality to one another, an image mixer that combines multiple images of the plurality to generate a single image. The image mixer may comprise an image normalizer that normalizes the image exposure level for each image, and an image blender that uses the normalized exposure level to blend a first selected image and a second selected image to generate an intermediate image, and when the plurality is composed of two images, outputs the intermediate image as a mixed output image. When the plurality is composed of more than two images, the image blender may repeatedly blend the previously generated intermediate image in place of the first selected image and another selected image in place of the second selected image until all images have been blended, and outputs the last generated intermediate image as the mixed output image.

The image capturing device may further include a degamma converter that selectively converts the images from a lower bits-per-pixel format to a higher bits-per-pixel format prior to image mixing, and selectively converts the mixed output image to a predetermined lower bits-per-pixel format.

The image capturing device may further comprise a luma conversion circuit that outputs the luma value of an input pixel, a look-up table that outputs a weighting value between the numbers zero and unity for an input luma value, a processing circuit that acquires a derived luma value for a pixel in the second selected image from the luma conversion circuit, obtains a weighting value from the look-up table for the derived luma value, and generates a processed second selected image pixel from the second selected image pixel, the normalized exposure level of the second selected image, and the weighting value, and a second processing circuit that receives as inputs the result of subtracting the weighting value from unity, and the first selected image pixel corresponding to the second selected image pixel, and generates a processed first selected image pixel, and an adder circuit that adds the processed first selected image pixel to the processed second selected image pixel to generate a blended image pixel.

The image capturing device may output a lower weighting value as the input luma value to the look-up table increases. It may also use first look-up table for the first selected image and a second look-up table for the second selected image. The image capturing device may begin mixing the plurality of images prior to the capture of all the images of the plurality. It may begin mixing the plurality of images immediately after the capture of the second image of the plurality.

The invention may further be embodied as an image capturing device that captures a plurality of digital images of a scene at different exposure levels and different times, comprising an image registration processor that registers the counterpart pixels of each image to one another, an image mixer that combines multiple images to generate a mixed image, and a ghost remover. The ghost remover removes location shifted replications of scene objects appearing in the mixed image, and may include an image normalizer that normalizes the image exposure level for each image to a specific standard deviation and mean, a reference image selection circuit that selects at least one reference image from the images, a local motion detector circuit that detects local motion between the reference image and at least one comparison image, a clustering circuit that clusters comparison image pixels having local motion into patches and selects corresponding patches from the reference image, and a binary connected image generator circuit that logically ORs the patches generated from particular reference images together, where the image mixer combines the mixed image with the reference images in a final stage of processing, with each reference image weighted by a weighting value computed from the binary connected image, to produce an output image.

The local motion detector circuit may detect local motion by determining an absolute luma variance between each pixel of the reference image and the comparison image to produce a difference image, and identifying difference image regions having absolute luma variances exceeding a threshold. The clustering circuit may cluster comparison image pixels by finding sets of connected image blobs using morphological operations, and bounding each set by a polygon. The selected scene images used as reference images may include the scene image with the lowest exposure level, the scene image with the highest exposure level, or any scene images with intermediate exposure levels. The image capturing device may also include circuitry to downscale luma values for the images. The reference image selection circuit may select a reference image from the scene images by, for a candidate reference image of intermediate exposure value, calculating a sum of areas of saturated regions and a ratio of the sum of saturated areas to total patch areas, selecting the candidate reference image as the reference image when the ratio is less than or equal a parameter value, for example to 0.03 to 1, and selecting an image of less than intermediate exposure value as the reference image when the ratio is greater than the parameter value.

Another embodiment is a digital camera that captures a plurality of digital images of a scene at different exposure levels at different times, and generates therefrom a tone mapped high dynamic range image. The camera may include an image registration processor that registers counterpart pixels of each image of the plurality to one another, an image mixer that combines multiple images of the plurality to generate a single image, a ghost remover that removes location shifted replications of scene objects appearing in the mixed image, and a tone mapping processor that maps the processed mixed image pixels to display pixels with the number of digital bits that can be presented on a built-in digital camera image display.

The image mixer may include an image normalizer that normalizes the image exposure level for each image, and an image blender that uses the normalized exposure level to blend a first selected image and a second selected image to generate an intermediate image, and when the plurality is composed of two images, outputs the intermediate image as a mixed image. When the plurality is composed of more than two images, the image mixer may repeatedly blend the previously generated intermediate image in place of the first selected image and another selected image in place of the second selected image until all images have been blended, and outputs the last generated intermediate image as the mixed image.

The ghost remover may include an image normalizer that normalizes the image exposure level for each image to a specific standard deviation and mean, a reference image selection circuit that selects at least one reference image from the images, a local motion detector circuit that detects local motion between the reference image and at least one comparison image, a clustering circuit that clusters comparison image pixels having local motion into patches and selects corresponding patches from the reference image, and a binary connected image generator circuit that logically ORs the patches generated from particular reference images together, wherein the image mixer combines the mixed image with the reference images in a final stage of processing, with each reference image weighted by a weighting value computed from the binary connected image, to produce a processed mixed image.

The digital camera may implement the image registration processor, the image mixer, the ghost remover, and/or the tone mapping processor by the use of at least one programmable general purpose processor, or at least one programmable application specific processor, or at least one fixed function application specific processor.

The invention may be embodied as a method for detecting local motion between a reference image and a plurality of comparison images. The method may include defining a number of luma thresholds that determine a group of reference image luma value ranges in which a particular comparison image is selected, the number corresponding to the number of comparison images, and defining a difference threshold function that sets threshold values according to luma values of the reference image. Then, for each particular comparison image, the method may include producing an intermediate detection map denoting local motion between the reference image and the particular comparison image by applying the threshold values on a difference image formed by comparing the reference image and the particular comparison image. Finally, the method may output a final detection map that is a union of the intermediate detection maps. The method may select a relatively lower luma comparison image in relatively higher reference image luma value ranges, and vice-versa. The luma threshold value set may vary with difference image luma values. The intermediate detection map may be produced by considering pixels with luma values in a range corresponding to the particular comparison image, calculating the standard deviation and mean of the considered pixels, normalizing the considered pixels to have the same standard deviation and mean for the reference image and the particular comparison image, creating an absolute difference map of the considered pixels, and using the difference threshold function on the difference map to identify local motion detections.

Another embodiment of the invention is a method for clustering pixels into patches, comprising applying a morphological dilation operation on a binary image of relevant pixels, with a 5×5 square structuring element for example, applying a morphological close operation on the binary image, with a 5×5 square structuring element for example, applying a binary labeling algorithm to distinguish different patches, describing each patch by a bounding polygon, and outputting the patch description. In this embodiment, the relevant pixels may share identified properties, that may include inconsistent luma values from at least one image comparison, or detected local motion. The bounding polygon may be an octagon.

In a further embodiment, a method is provided for selecting a replacement image from a plurality of candidate replacement images as a source for replacement patch image data. The method may include computing a weighted histogram of luma values of border area pixels of a particular patch of a reference image, dividing the histogram into a plurality of regions according to threshold values determined from relative exposure values of the candidate replacement images, calculating a score function for each histogram region, selecting the region with the maximum score, and outputting the corresponding candidate replacement image. The histogram weighting may increase the influence of over-saturated and under-saturated luma values. In this embodiment, candidate replacement images of relatively low exposure values may be selected for replacing patches from reference images of relatively high exposure values, and vice-versa. The reference image may be a medium exposure image with downscaled luma values. The score function for a particular histogram region may be defined as the ratio of the number of pixels in the particular histogram region considering the size of the particular histogram region, to the average difference of the histogram entries from the mode luma value for the particular histogram region.

Additionally, the invention may be embodied as a method for replacing patch image data in a composite image, comprising smoothing a patch image bounding polygon, upscaling the smoothed patch images to full image resolution, and blending the composite image and the upscaled smoothed patch image to produce an output image. The patch image bounding polygon may be an octagon. The patch image bounding octagon may be represented in 8-bit format and a low pass filter, 7×7 for example, is applied.

Another embodiment is a method for converting images from an initial format to a lower bits-per-pixel format, comprising performing a tone mapping that adapts to image luma values and outputting the tone mapped image. The method may further include performing a non-linear local tone mapping that maps a pixel according to its neighbors' average luma values into individual color components each represented by a predetermined number of bits. The method may further allocate additional gray scale levels for more frequent luma values. Images may be converted to a display format having pixels with the number of bits that can be presented on a built-in digital camera image display. The method may also define a family of local mapping look-up tables and a single global mapping look-up table, and use a selected look-up table for each image conversion operation, wherein look-up table selection is based on the image scene characteristics. The method may further construct a luminosity histogram of a composite image, and define a mapping according to the distribution of luminosity values. The luminosity histogram may be estimated using a combination of histograms of the downscaled images used to form the composite image. Histogram equalization may define the mapping.

The invention may be embodied as a system for detecting local motion between a reference image and a plurality of comparison images. The system may include a processor that defines a number of luma thresholds that determine a group of reference image luma value ranges in which a particular comparison image is selected, the number corresponding to the number of comparison images, and defines a difference threshold function that sets threshold values according to luma values of the reference image. Then, for each particular comparison image, the processor may produce an intermediate detection map denoting local motion between the reference image and the particular comparison image by applying the threshold values on a difference image formed by comparing the reference image and the particular comparison image. Finally, the processor may output a final detection map that is a union of the intermediate detection maps. The system may select a relatively lower luma comparison image in relatively higher reference image luma value ranges, and vice-versa. The luma threshold value set may vary with difference image luma values. The intermediate detection map may be produced by considering pixels with luma values in a range corresponding to the particular comparison image, calculating the standard deviation and mean of the considered pixels, normalizing the considered pixels to have the same standard deviation and mean for the reference image and the particular comparison image, creating an absolute difference map of the considered pixels, and using the difference threshold function on the difference map to identify local motion detections.

Another embodiment of the invention is a system for clustering pixels into patches, comprising a processor that may apply a morphological dilation operation on a binary image of relevant pixels, with a 5×5 square structuring element for example, apply a morphological close operation on the binary image, with a 5×5 square structuring element for example, apply a binary labeling algorithm to distinguish different patches, describe each patch by a bounding polygon, and output the patch description. The relevant pixels may share identified properties, that may include inconsistent luma values from at least one image comparison, or detected local motion. The bounding polygon may be an octagon.

In a further embodiment, a system is provided for selecting a replacement image from a plurality of candidate replacement images as a source for replacement patch image data. The system may include a processor that computes a weighted histogram of luma values of border area pixels of a particular patch of a reference image, divides the histogram into a plurality of regions according to threshold values determined from relative exposure values of the candidate replacement images, calculates a score function for each histogram region, selects the region with the maximum score, and outputs the corresponding candidate replacement image. The histogram weighting may increase the influence of over-saturated and under-saturated luma values. In this embodiment, candidate replacement images of relatively low exposure values may be selected for replacing patches from reference images of relatively high exposure values, and vice-versa. The reference image may be a medium exposure image with downscaled luma values. The score function for a particular histogram region may be defined as the ratio of the number of pixels in the particular histogram region considering the size of the particular histogram region, to the average difference of the histogram entries from the mode luma value for the particular histogram region.

Additionally, the invention may be embodied as a system for replacing patch image data in a composite image, comprising a processor that smooths a patch image bounding polygon, upscales the smoothed patch images to full image resolution, and blends the composite image and the upscaled smoothed patch image to produce an output image. The patch image bounding polygon may be an octagon. The patch image bounding octagon may be represented in 8-bit format and a low pass filter, 7×7 for example, is applied.

Another embodiment is a system for converting images from an initial format to a lower bits-per-pixel format, comprising a processor that performs a tone mapping that adapts to image luma values, and outputs the tone mapped image.

The system may further have the processor perform a non-linear local tone mapping that maps a pixel according to its neighbors' average luma values into individual color components each represented by a predetermined number of bits. The system may further have the processor allocate additional gray scale levels for more frequent luma values. The system may convert images to a display format having pixels with the number of bits that can be presented on a built-in digital camera image display. The system may also include the processor defining a family of local mapping look-up tables and a single global mapping look-up table, and using a selected look-up table for each image conversion operation, wherein look-up table selection is based on the image scene characteristics. The system may further comprise the processor constructing a luminosity histogram of a composite image, and defining a mapping according to the distribution of luminosity values. The luminosity histogram may be estimated using a combination of histograms of the downscaled images used to form the composite image. Histogram equalization may define the mapping.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF THE EMBODIMENTS

The invention will now be described more fully hereinafter with reference to the accompanying drawings, which form a part thereof, and which show, by way of illustration, specific embodiments by which the invention may be practiced. The invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment in the form of modules or circuits, and entirely software embodiment in the form of software executed on a general purpose microprocessor, an application specific microprocessor processor, a general purpose digital signal processor or an application specific digital signal processor, or an embodiment combining software and hardware aspects. Thus, in the following description, the terms "circuit" and "module" will be used interchangeably to indicate a processing element that executes an operation on an input signal and provides an output signal therefrom regardless of the hardware or software form of its implementation. Likewise, the terms "register", "registration", "align" and "alignment" will be used interchangeably to indicate the process of causing like objects to correspond one to another, and be in correct adjustment, regardless if the mechanism employed to bring about such correspondence is implemented in the form of hardware or software. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or", unless the context clearly dictates otherwise. The term "based on" is not exclusive and allows for being based on additional factors not described, unless the context clearly dictates otherwise. In addition, throughout the specification, the meaning of "a", "an", "and" and "the" include plural references. The meaning of "in" includes "in" and "on". Also, the use of "including", "comprising", "having", "containing", "involving", and variations thereof herein, is meant to encompass the items listed thereafter and equivalents thereof as well as additional items.

Figure 1:
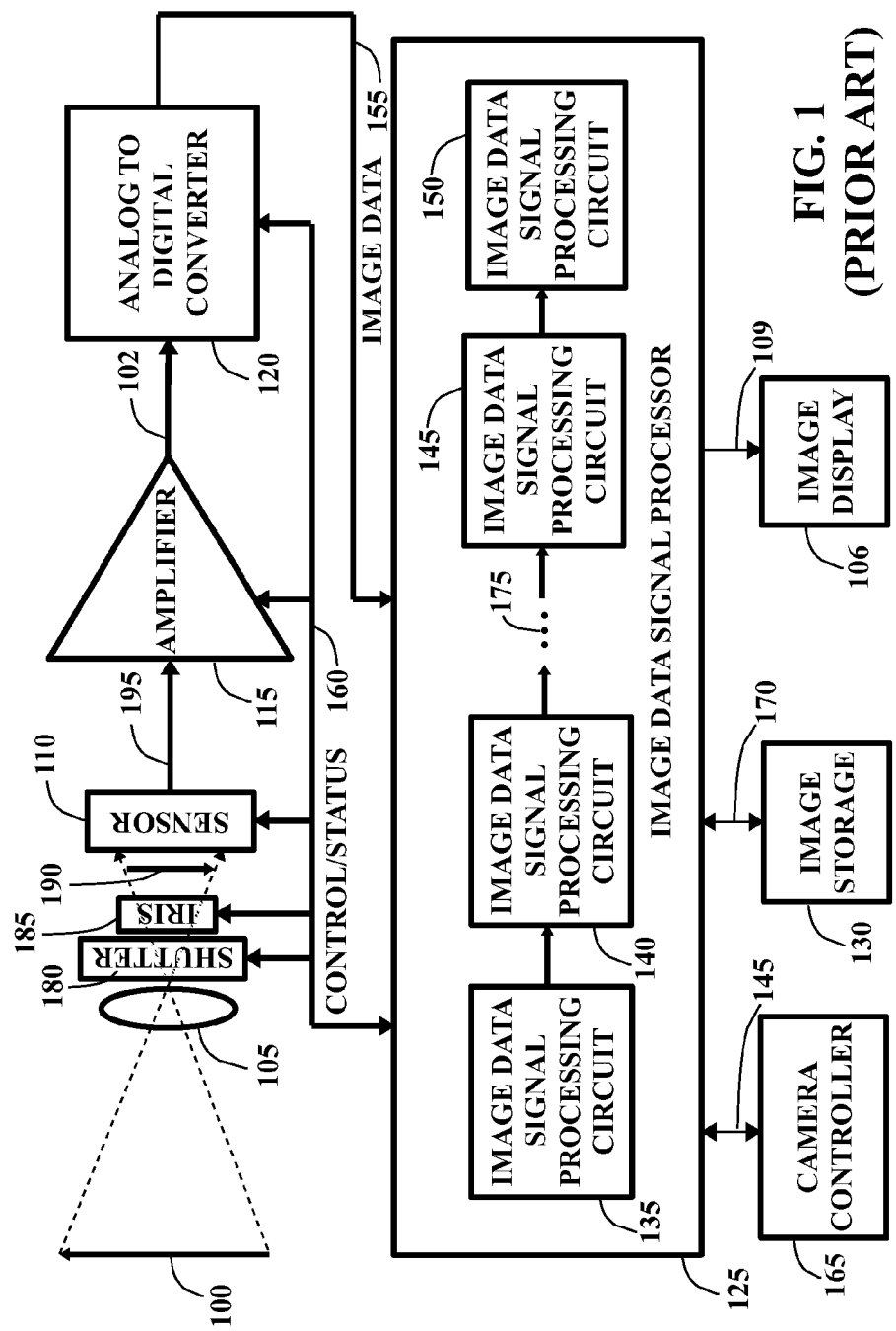
FIG. 1 is a block diagram of a digital camera or other image capture apparatus that captures a plurality of digital images of a scene, at different exposure levels and at different times, and displays these images on the camera's built-in image display.

FIG. 1 shows a digital camera or other image capture apparatus which includes an Imaging Optical System 105, an Electronically Controlled Shutter 180, an Electronically Controlled Lens iris 185. an Optical Image Sensor 110, an Analog Amplifier 115, an Analog to Digital converter 120, an Image Data Signal Processor 125, an Image Data Storage Unit 130, an Image Display 106, and Camera Controller 165. The Image Data Storage unit could be a memory card or an internal nonvolatile memory. Data of images captured by the camera may be stored on the Image Data Storage Unit 130. In this exemplary embodiment, it may also include internal volatile memory for temporary image data storage and intermediate image processing results. This volatile memory can be distributed among the individual image data processing circuits and need not be architecturally located in a single image data storage unit such as Image Data Storage Unit 130. The Optical System 105 can be a single lens, as shown, but will normally be a set of lenses. An Image 190 of a Scene 100 is formed in visible optical radiation onto a two-dimensional surface of an image sensor 110. An electrical output 195 of the sensor carries an analog signal resulting from scanning individual photo-detectors of the surface of the Sensor 110 onto which the Image 190 is projected. Signals proportional to the intensity of light striking the individual photo-detectors are obtained in the output 195. The analog signal 195 is applied through an Amplifier 115 to an Analog to Digital Converter 120 by means of amplifier output 102. Analog to Digital converter 120 generates an image data signal from the analog signal at its input and, through output 155, applies it to Image Data Signal Processor 125. The photo-detectors of the Sensor 110 typically detect the intensity of the light striking each photo-detector element in one of two or more individual color components. Early detectors detected only two separate colors of the image. Detection of three primary colors, such as red, green and blue (RGB) components, is now common. Currently image sensors that detect more than three color components are becoming available.

Multiple processing operations are performed on the image data signal from Analog to Digital Converter 120 by Image Data Signal Processor 125. Processing of the image data signal, in this embodiment, is shown in FIG. 1 as being effected by multiple image data signal processing circuits within Image Data Signal Processor 125. However, these circuits can be implemented by a single integrated circuit image data signal processor chip that may include a general purpose processor that executes algorithmic operations defined by stored firmware, multiple general purposed processors that execute algorithmic operations defined by stored firmware, or dedicated processing logic circuits as shown. Additionally, these operations may be implemented by several integrated circuit chips connected together, but a single chip is preferred. FIG. 1 depicts the use of image data signal processing circuits 135, 140, 145, and 150 connected in series to effect multiple algorithmic processing operations on the image data signal from Analog to Digital Converter 120. The result of these operations is a stored nonvolatile digital image data that can be viewed either on the digital camera's internal Image Display 106 of FIG. 1, or an external display device. This viewing can be effected either by the physical removal of a memory card from the digital camera and the reinsertion of this card into an external display device, or the electronic communication of the digital camera with an external display device by the use of a Universal Serial Bus (USB) connection, or a Wi-Fi or Bluetooth wireless local area network.

Additional processing circuits as indicated by the dots 175 between circuit 145 and 150, can be included in the digital camera's image data signal processor. The series structure of the image data signal processor of the embodiment is known as a "pipeline" architecture. This architectural configuration is employed as the exemplary embodiment of the invention, however other architectures can be used. For example, an image data signal processor with a "parallel architecture", in which one or more image data signal processing circuits are arranged to receive processed image data signals from a plurality of image data signal processing circuits, rather than after they have been processed serially by all preceding image data signal processing circuits, can be employed. A combination of a partial parallel and a partial pipeline architectures is also a possibility.

Figure 2:
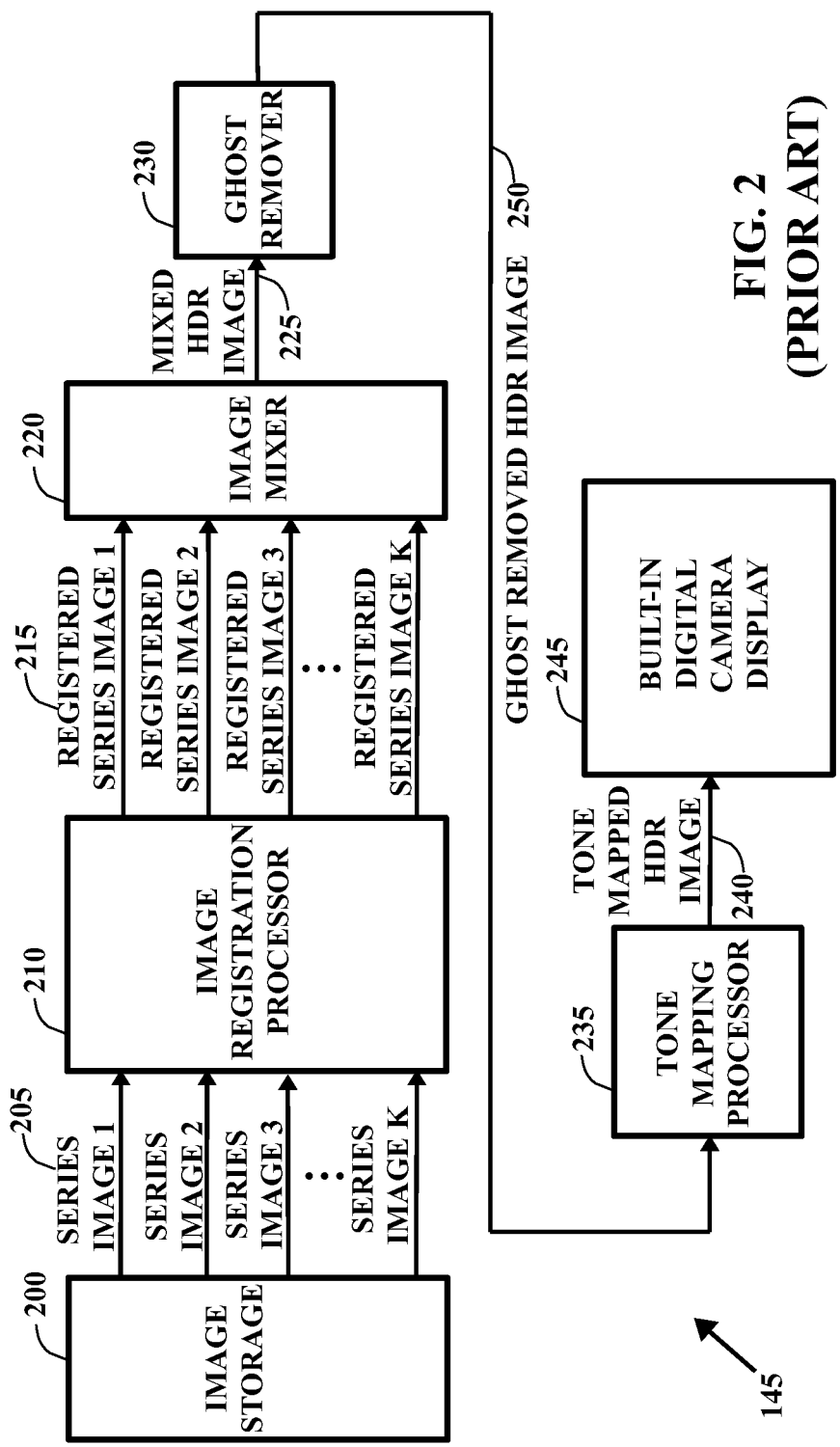
FIG. 2 is a high level block diagram of processing modules as implemented in a digital camera.

The series of image data signal processing circuits of Image Data Processor 125, is called an "image processing pipe". Embodiments add image data signal processing circuits shown in FIG. 2 to those routinely included in the image processing pipe of a digital camera. Image data signal processing circuits routinely included in the image processing pipe of a digital camera include circuits for White Balance Correction (WBC), Lens Shading Correction (LSC), Gamma Correction (GC), Color Transformations (CTM), Dynamic Range Compression (DRC), Demosaicing, Noise Reduction (NR), Edge Enhancement (EE), Scaling, and Lens Distortion Correction (LDC). As depicted in FIG. 2, embodiments add an Image Registration Processor (IRP) circuit 210, an Image Mixer (IM) circuit 220, Ghost Remover (GR) circuit 230, and Tone Mapping Processor (TMP) circuit 235 to the complement of image data signal processing circuits discussed above. Image Storage 200 of FIG. 2 stores the digital data of a series of two or more images of a scene, each series image composed of pixels containing digital bits, these digital bits having been processed by Image data signal processing circuits in the image processing pipe. Image Storage 200 could share memory with Image Storage 130 of FIG. 1, however, memory resources used for temporary image data storage and intermediate image processing results, or totally separate volatile or nonvolatile memory resources, could provide the memory resources used by Image Storage 200.

Referring to FIG. 1, Camera Controller 165, through line 145 and Control/Status lines 160, causes Electronic Shutter 180, Electronic Iris 185, Image Sensor 110, Analog Amplifier 115, and Analog to Digital converter 120 to capture and convert to digital image data a series of images of a scene. These images are captured at different exposure levels, processed by Image data signal processing circuits, and stored in Image Storage 200 of FIG. 2. Image Registration Processor 210 reads the image series digital image data stored in Image Storage 200 and registers counterpart pixels of each image of the image series one to the other where one image (generally the image with the medium exposure time) serving as a reference image. Image registration is executed before image mixing in order to pixel to pixel align all series images. Due to camera movement occurring during image series capture, such alignment is necessary for image mixer 220 of FIG. 2 to be able to properly combine series image pixels and form an image with the captured scene's full range of gray shades. Such an image is often referred to as a "High Dynamic Range" or "HDR" image. In Image Mixer 220, each series image pixel of each captured series image is combined with its pixel counterpart in each captured series image. Thus, an image pixel representing a particular position on the edge or within the body of an object appearing in a first series image is mixed with its counterpart located at the same position on the edge or within the body of the same object appearing in a second series image. In this regard, the location of a pixel in an image is with respect to the object in which it is part of, not to the fixed coordinate system of the defined by the vertical and horizontal outer edges of the image.

Image Registration Processor 210, in general, employs a first image captured at a nominal exposure setting of the camera as a reference image to which all the other images of the series are aligned. A number of techniques are in current use for image alignment and registration. A good example is described in "High Dynamic Range Video", by S. B. Kang, M. Uyttendaele, S. Winder, and R. Szeliski, Interactive Visual Media Group, Microsoft Research, Redmond, Wash., 2003.

The approach described handles both camera movement and object movement in a scene. For each pixel a motion vector is computed between successive series images. This motion vector is then refined with additional techniques, such as hierarchical homography, to handle degenerate cases. Once the motion of each pixel is determined, frames can be warped and registered with the chosen reference image. The images can then be mixed by Image Mixer 220 into an HDR image.

It should be noted that from practical point of view, in the present application motion vectors of N×M blocks are derived rather than motion vectors for every pixel. In addition, once the motion vectors are given, a general transformation [x'y']=f(x,y) is derived where x' and y' are the new locations of a given point {x,y}.

The Image Mixing Process

Figure 3:
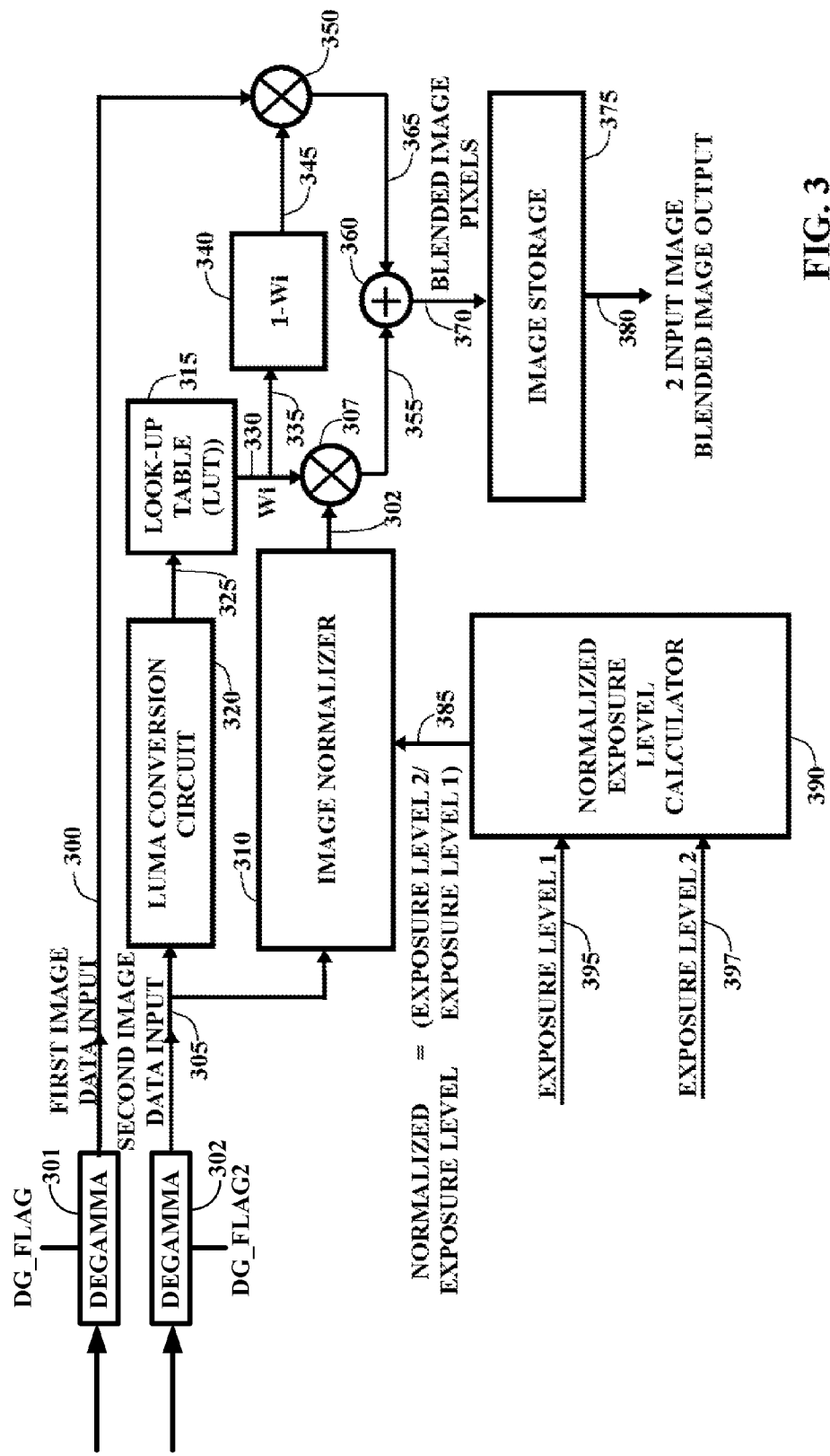
FIG. 3 is a block diagram of the 2 Image Blending Engine according to embodiments of the invention.
Figure 4:
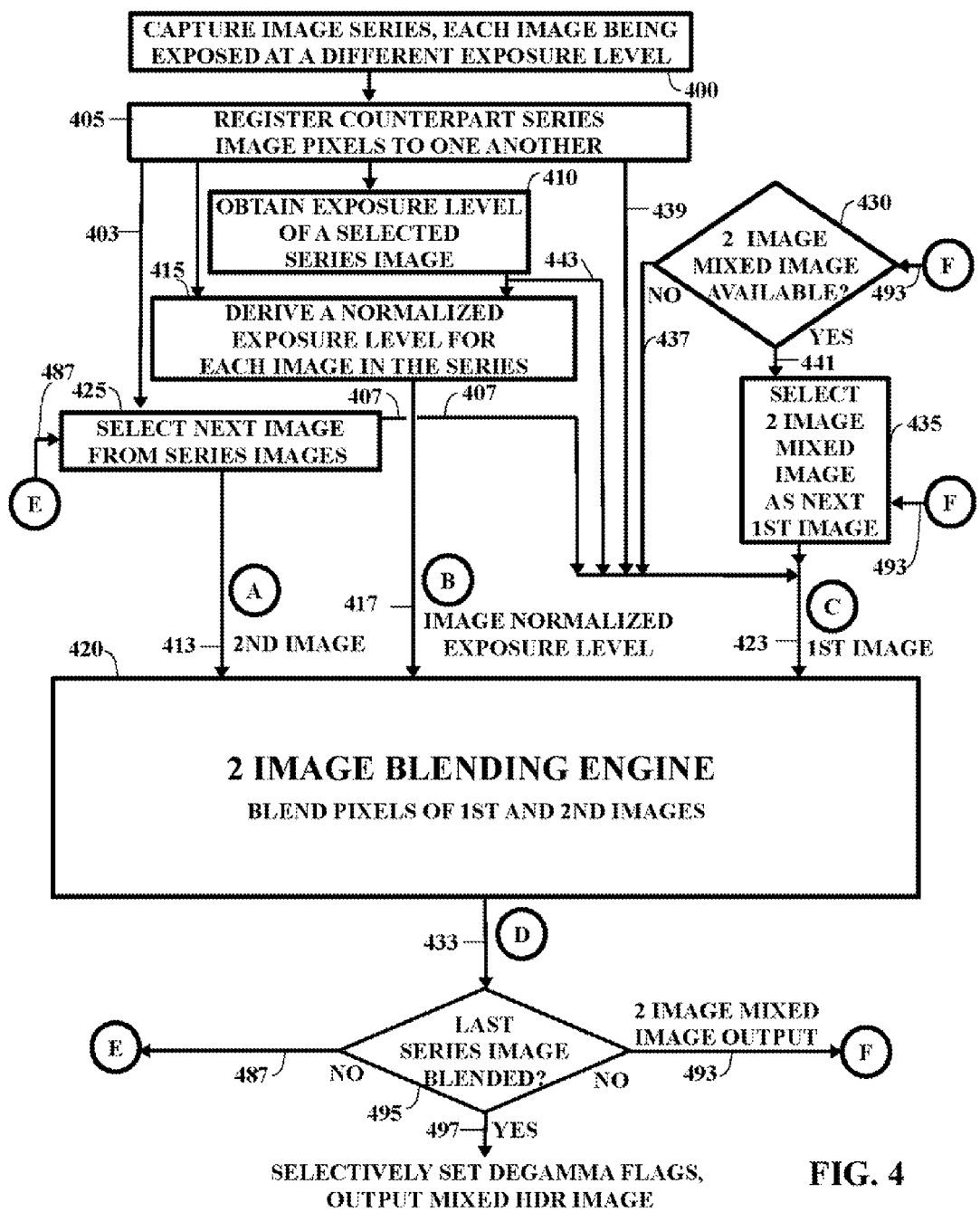
FIG. 4 is a flowchart illustrating the complete image mixing process sequence of an Image Mixer processing method according to embodiments of the invention.

Image Mixer 220 has the ability to mix an unlimited number of images, but employs an image blending engine that mixes the pixels of two images at a time. The 2 Image Blending Engine of Mixer 220 is shown in FIG. 3. In an embodiment of the invention, the blending engine blends the pixels of a first 8-bit image whose digital image data appears on input line 300 and the pixels of a second 8-bit image whose digital image data appears on input line 305. Images with bit widths that are wider than 8 bits, for example 10 bits, or narrower, for example 7 bits can be used. The flowchart of FIG. 4 illustrates the complete image mixing process of Image Mixer 220, and FIG. 4A details Block 420 of FIG. 4, the process used by the 2 Image Blending Engine of FIG. 3.

Referring to FIG. 3, the image mixing process blends two images during each image mixing operation. The first two images to be blended are both taken from the captured image series, wherein each image of the captured image series has been previously registered with a reference image captured at a nominal exposure setting of the camera. For the initial image mixing operation the series image with a lower exposure level provides the First Image digital image data input appearing on line 300 of FIG. 3, and the series image with a higher exposure level provides the Second Image digital image data input appearing on line 305. For a second and all subsequent image mixing operations, a subsequent image of the series is blended with the result obtained from a previous image mixing operation. For these follow-on mixing operations, the digital image data of a subsequent image of the series serves as the Second Image digital image data input appearing on 305, and the mixed image digital image data result serves as the First Image digital image data input appearing on line 300 of FIG. 3. In all cases, the subsequent image of the series has been exposed at a higher exposure level than its immediate image series predecessor.

The Second Image digital image data on line 305 is initially processed in two ways. (1) Luma Conversion Circuit 320 extracts the luma, the black and white component, of the combined Red, Green and Blue (RGB) component data comprising Second Image digital image data 305, and outputs the luma component of each image data pixel on line 325. (2) Image Normalizer 310 normalizes the exposure level of each RGB component of the Second Image image data on line 305 to the exposure level of a reference image, and outputs on line 302 each image data pixel, for each color component, normalized to the reference image exposure level. Note that the reference image used is not necessarily the same reference image used for the registration process previously described. For one embodiment of the invention the exposure level of the darkest image of the series, that is the image which is least exposed, serves as the reference exposure level and all other images of the series are normalized to it. For example, if the captured image series is composed of three images, a dark image exposed for $1/64$ sec, a medium image exposure at $1/16$ sec and a bright image exposed at $1/2$ sec, the normalized value of each pixel of the medium image appearing on line 302 would be:

$$\text{Medium Pixel Value}_{Normalized} = \text{Medium Pixel Value}_{Input}/((1/16)/(1/64)) = \text{Medium Pixel Value}_{Input}/4; \quad (1)$$

and the normalized value of each pixel of the bright image appearing on line 302 would be:

$$\text{Bright Pixel Value}_{Normalized} = \text{Bright Pixel Value}_{Input}/((1/2)/(1/64)) = \text{Bright Pixel Value}_{Input}/32 \quad (2)$$

Therefore, for this embodiment of the invention:

$$\text{Exposure Level}_{Normalized} = \text{Exposure Level}_{Series\ Image}/\text{Exposure Level}_{Least\ Exposed\ Series\ Image} \quad (3)$$

and the normalized value of each pixel of the Second Image Data input on line 305 and output on line 302 is:

$$\text{2nd Image Pixel Value}_{Normalized} = \text{2nd Image Pixel Value}_{Input}/\text{2nd Image Exposure Level}_{Normalized} \quad (4)$$

The luma component of each Second Image digital image data pixel appearing on line 325 of FIG. 3 is input to Look-up Table (LUT) 315 to obtain a per pixel weighting parameter, Wi, on lines 330 and 335. The luma component of each Second Image pixel serves as an index into LUT 315, and causes a weighting parameter value Wi between the numbers zero and Unity to be output to lines 330 and 335 for each input luma value. This value is output in the form of a two dimensional matrix where:

$$W(m,n) = 255 - \text{Luma}(m,n); \quad (5)$$

Luma(m, n) is the luma of component of each Second Image digital data pixel at image coordinates (m, n), which, for this embodiment of the invention, can attain a maximum value of 255, since the embodiment blends the pixels of 8-bit series images, and 255=Unity, which, represents Table 315's 100% output value. Second Image pixel values serving as indexes into LUT 315, are 8-bit digital values with a number range from 0 to 255. Therefore, defining 255 as Unity allows for a direct mapping from input index value to output weighting parameter value and reduces weighting parameter application computational work load. Other values of Unity can be chosen. For example, if the luma component Second Image pixel values serving as indexes into LUT 315 are 10-bit digital values, with a number range from 0 to 1023, it would be appropriate and beneficial to assign Unity the value of 1023.

For this embodiment, the weighting parameter value output from LUT 315 linearly decreases as the luma component Second Image pixel value, serving as the index into LUT 315, increases. Other LUT functions, for example, trapezoidal shaped functions in which the weighting parameter value obtained from LUT 315 remains at a predetermined value and starts to linearly increase when the luma component Second Image pixel value index decreases below a threshold, may be used as well. The choice of LUT 315 functions is based on the observation that when two images are mixed, one which is highly saturated, due to being exposed at a high exposure level, perhaps at a long exposure time, and the other dark, due to being exposed at a lower exposure level, perhaps at a short exposure time, it is desirable to apply a low weight to the highly saturated pixels of the image with the high exposure level, while applying a high weight to the counterpart pixels of image with the low exposure level. This will result in a mixed image with fewer highly saturated pixels, since many have been supplanted by counterpart, properly exposed pixels. The result is a mixed image with greater detail in its highlight areas, while pixels belonging to the shadow region will be taken mainly from the higher exposure image.

The embodiments are not restricted to the use of a single LUT 315. A plurality of LUTs can be used. In this case a different LUT can be associated with each Series Image for obtaining the weighting value, or two or more Series Images can be associated with the same LUT from a plurality of provided LUTs. These LUTs can, for example, be populated with weighting parameter values responsive to Series Image exposure levels.

In the present application, an improvement is provided in certain embodiments not available in the parent application. Image sensors are typically of at least 12 bits resolution, while current displays are of only 8 bits resolution, thus a non-linear gamma operation is applied on original pixels during capture to limit the range to 8 bits for display. Therefore, in certain embodiments provided in the present application, the blending is preferably carried out on a "degamma'd version" of two input images Im1 and Im2, where the degamma operation is a LUT that moves the RGB image pixels back from 8 bits (i.e. the non-linear domain) to 16 bits (i.e. the linear domain), thus:

$$\text{Blended\_Image} = \text{degamma}(Im1) \times (1-W) + \text{degamma}(Im2) \times W \quad (6)$$

Moreover, since exposure is done in the linear domain, the normalization to exposure time should be done in that domain as well.

Preferred embodiments of the present invention may be implemented by making minor modifications to the embodiments described in the parent application, as is now described. With respect to the parent application implementation shown as FIG. 3 of that application for example, degamma function blocks 301 and 302 are now added prior to the image normalizer as shown in FIG. 3 of the present application. These blocks may be selectively enabled by flags, e.g. DG_FLAG and DG_FLAG2. Also, the first time the iterative process described above is carried out, first image data input (300) is converted to the degamma (i.e. linear) domain. On the next iterations using a 2 Image Blending Engine, there is no need to apply a degamma on the First Image if the blended output from a previous stage is being used and is in the degamma domain already. Similarly, the FIG. 4A implementation of the parent application may be modified according to preferred embodiments of the present invention by adding an additional pixel degamma function at Normalize Pixel (block 429). This block may be also be selectively enabled/disabled by an external flag. Likewise, when embodiments of the present invention transmit images to inputs 500 and 505 of the circuitry shown in FIG. 5, those images may also be processed to be in the degamma domain if required.

During the blending operation, the weighting parameter is applied, on a pixel by pixel basis, to each color component of the normalized Second Image digital image data appearing on line 302, and 1 minus the weighting parameter e.g. (1−Wi) is applied to each color component of the First Image digital image data appearing on line 300. The pixel by pixel blending operation is defined by the following equation:

$$\text{Blended Image Data Pixel} = (1-Wi) \times (\text{1st Image Data Pixel}) + Wi \times (\text{Normalized 2nd Image Data Pixel}) \quad (7)$$

The processing blocks of FIG. 3 execute Equation (7) as follows: The luma of the Second Image Data on Line 305 is derived by Luma Conversion circuit 320 and used by LUT 315 to generate weighting parameter Wi on Lines 330 and 335. Multiplier 307 multiplies normalized Second Image Digital Image Data, normalized by Image Normalizer 310, by Wi on Line 330 and outputs the result on Line 355. Wi is also applied to Data Subtractor 340 through Line 335, which outputs (1−Wi) on Line 345. First Image Digital Image Data on Line 300 is multiplied by (1−Wi) on Line 345 by Multiplier 350 and outputs the result on Line 365. The Normalized and weighted Second Image Digital Image Data on Line 355 is added to weighted First Image Digital Image Data on line 365 by adder 360. Adder 360 outputs Blended Image Pixels on Line 370. These pixels are stored in Image Storage 375 and output as 2 Image Blended Image Data on Line 380.

Figure 4A:
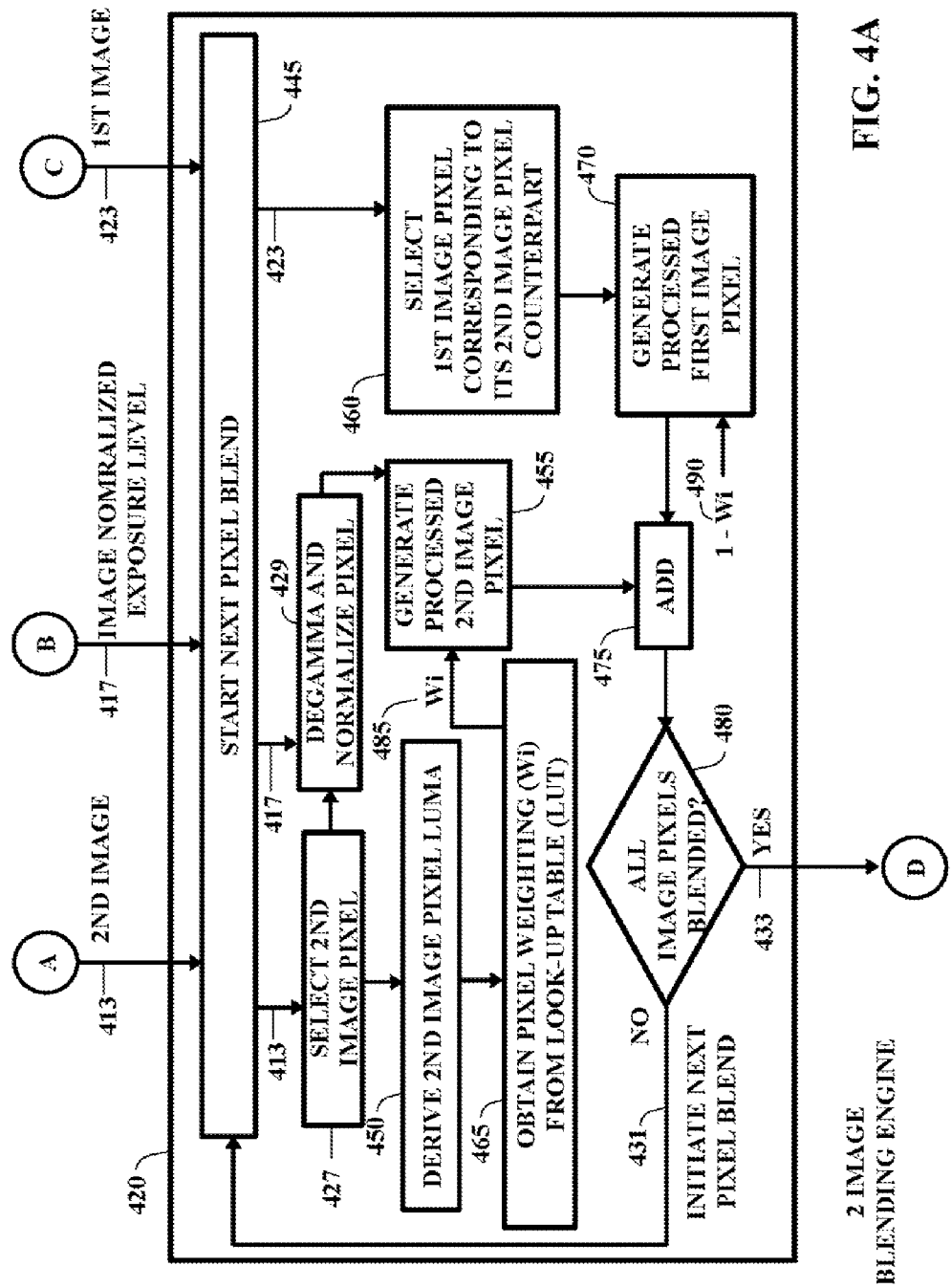
FIG. 4A details the process used by the 2 Image Blending Engine of FIG. 3 according to embodiments of the invention.

The pixel blending process used by the 2 Image Blending Engine of FIG. 3 is depicted in processing Block 420 of FIG. 4A. The data of the First Image to be blended enters the process at 423 and the data of the Second Image to be blended enters the process at 413. The pixel blending process begins at 445. At 427 a pixel from the Second Image is selected. The selected Second Image pixel is normalized at 429 and its luma is derived at 450. The Second Image pixel's luma is used to obtain weighting parameter Wi, 485, from a LUT at 465. The normalized Second Image pixel is multiplied by weighting parameter Wi, 485, at 455. The normalized and weighted Second Image pixel enters an adding process at 475. The First Image Pixel counterpart of the selected Second Image Pixel is selected at 460 and multiplied by (1−Wi) at 470. The weighted First Image pixel enters the adding process at 475 and is blended with the normalized and weighted Second Image pixel. If there are more image pixels left to blend, as determined at decision point 480 and indicated by "No" on 431, then the next pixel blend cycle is initiated at 445, causing a next First Image pixel and a next Second Image pixel to be selected at 460 and 427, respectively, and blended as described.

If there are no more image pixels left to blend, as determined at decision point 480 and indicated by "Yes" on 433, but there are more images in the captured image series to mix, as determined at decision point 495 and indicated by "No" on 487, then another Second Image is selected from the remaining, unmixed series images, whose data will serve as the next Second Image data to be blended. In the parent application implementations, the Second Image selected will have a higher exposure level than the previous Second Image selection, however in the embodiments of the present application such constraints do not apply; images may be processed in any order, regardless of relative exposure level. Such selection is made by Image Selection Process 425 in response to the "No" on 487. Additionally, the 2 Image Mixed Image Output Data at 493 is selected by First Image data selection process 435 as the next First Image data to be blended, due to decision point 430 signaling "Yes" to process 435 at 441, in response to 2 Image Mixed Image data begin available at 493. If 2 Image Mixed Image data is not available at 493, as would be the case at the beginning of an image mixing process, decision point 430 would signal processing Block 440, by placing a "No" at 437, to select a First Image from the captured image series to be blended with a lower exposure level than the Second Image (in the parent application embodiments) to be blended selected from the captured image series by processing Block 425. In this case, Selected Second Image exposure level information is communicated to selection Block 440 at 407, least exposed Series Image exposure level information is communicated to selection Block 440 at 443, and selected Series Image data is communicated to processing Block 440 at 439. As depicted in the flowchart of FIG. 4, and used in the present application embodiments of the invention, the Series Image with the least exposure level may not necessarily be selected as First Image. Further, the parent application block 440 is no longer necessary.

If there are no more images in the captured image series to mix, the process concludes with the Mixed HDR Image Output appearing at 497.

As previously described regarding the parent application implementation shown in FIG. 4A, a flag may be added at the image output point 497 to enable/disable a gamma operation for preferred embodiments of the present invention. For all series images this gamma operation will be OFF, except for the last one when the final output is delivered.

The flowchart of FIG. 4 of the present invention illustrates the complete image mixing process of Image Mixer 220. Block 420, depicting the 2 Image Blending process used by the 2 Image Blending Engine of FIG. 3, is highlighted in FIG. 4 and illustrated in detail in FIG. 4A. FIG. 4 also includes the processing that precedes 2 Image Blending processing Block 420. This processing comprises the capture of a series of images, each image being exposed at a different exposure level, at processing Block 400, the registration of counterpart series image pixels one to another, at processing Block 405, the determination of the series image that is least exposed (in the parent application), at Processing Block 410. The calculation of a normalized exposure level according to Equation (3) previously described, which may be referenced to the least exposed image of the series or to another image in this improved embodiment, for each image in the series, at processing Block 415. This calculated normalized exposure level is used by 429 of processing Block 420 to normalize each Second Image pixel, as previously described by Equation (4), before being multiplied by a weighting parameter and blended with a weighted First Image pixel according to Equation (7) previously described.

The image mixing process of Image Mixer 220 uses only summation and multiplications, thereby avoiding computationally intensive division operations, and allowing it to be implemented by a fixed point computational engine. In addition, since the mixing approach employed is based on successive two image mixing operations, there is no need to wait until all series images have been captured before initiating a mixing operation. The mixing process can begin immediately after just two images of the series have been captured. These characteristics allow the mixing process to rapidly create a HDR image from a bracketed exposed image series using a limited processing power computational engine.

The Ghost Removal Process

In the parent application, Ghost Remover 230 removes location shifted replications of scene objects, or ghosts, that appear in the Mixed HDR Image Output data at 497 of FIG. 4, due to the movement of these objects over the time the images of the series are captured. Fundamentally, ghosts appear due to the mixing of Series Images in which an object visualized in a First Series Image has moved with respect to its First Series Image location coordinates, as visualized in a Second Series Image. Consequently, in the mixed image, the object may appear in multiple locations with the locations depending on the object's motion rate and motion direction. Embodiments of the invention described in the parent application employ a unique two stage approach to mitigating ghost images.

Given a mixed image, HDR(i, j), generated from a weighted sum of images from a captured aligned image series of K images, the embodiment, in a first stage of processing, first calculates the variance of the luma value of every pixel of HDR(i, j) as follows:

$$V(i,j) = E_{fc} W(i,j,k) \times P^2(i,j,k) - HDR(i,j)^2 \qquad (8)$$

where:

V(i, j)=The variance of the luma value of Mixed HDR image pixel, HDR(i, j), located at image coordinates (i, j) with respect to the value of Kth Series Image pixel located at image coordinates (i, j), over the K aligned images of the captured image series;

HDR(i, j)=The luma value of the Mixed HDR image pixel located at image coordinates (i, j);

W(i, j, k)=A normalizing weight applied to the level of the Kth Series Image pixel located at image coordinates (i, j) to normalize the Series Image pixel level range to the pixel level range of the Mixed HDR image; and P(i, j, k)=The value of Kth Series Image pixel located at image coordinates (i, j);

and then replaces a Mixed HDR Image pixel whose luma variance exceeds a first threshold level with its counterpart pixel from an aligned reference image, $HDR_{ref}$, the reference image begin chosen from the captured image series, to generate first processed mixed image data, $HDR_{1st\ processed}$.

The first stage of ghost removing processing, described above, is based on the observation that if no local motion exists in the Series Images mixed, the variance of a pixel in the Mixed HDR Image output over the K aligned images of the captured image series, as defined by Equation (8) above, will be low. The only significant error associated with this assumption is alignment error. Since alignment is inherently a global process, it cannot compensate for local image object local motion, and thus local object motion is manifested as high amplitude pixel variance regions. By analyzing the high amplitude pixel variance regions in the two-dimensional variance data generated by Equation (8), regions of local motion in the Mixed HDR Image output data can be defined, and Mixed HDR Image output data pixels with variances above a predefined threshold can be replaced with counterpart pixels from the reference image. The reference image chosen is often the least exposed Series Image, but may be a Series Image exposed at a higher exposure level.

The embodiment's first stage of ghost removal processing generates first processed mixed image data, $HDR_{1st\ processed}$, with less ghosting. However some residual ghosting still remains. A second stage of processing improves these results by comparing the content of $HDR_{1st\ processed}$ with $HDR_{ref}$. In this second stage, ghost residuals are detected by analyzing the pixel to pixel result obtained by subtracting the luma of $HDR_{ref}$ from the luma of $HDR_{1st\ processed}$. A second threshold level based on the maximum value of the differences between the luma of $HDR_{1st\ processed}$ and the luma of $HDR_{ref}$ is generated. Each $HDR_{1st\ processed}$ data pixel exceeding the second threshold level is replaced with its counterpart $HDR_{ref}$ data pixel, resulting in second processed mixed image data, $HDR_{2nd\ processed}$, with fewer ghosts. The procedure used by this embodiment of the invention's second stage of processing can be summarized as follows:

(a) Generate D0=ABS(Luma($HDR_{1st\ processed}$)−Luma($HDR_{ref}$));

(b) Determine Threshold2nd=Max(D0)=$D_M0$.

(c) Replace each $HDR_{1st\ processed}$ data pixel exceeding Threshold2nd with its counterpart $HDR_{ref}$ data pixel, resulting in $HDR_{2nd\ processed}$ mixed image data (d) Compare $HDR_{2nd\ processed}$ with $HDR_{ref}$ and generate Max(D1)=Dm1 where Dm1=Max((ABS(Luma($HDR_{2nd\ processed}$)−Luma($HDR_{ref}$)))

(e) If Dm1>60% of DM0, Threshold2nd is too large and $HDR_{2nd\ processed}$ may look too much like $HDR_{ref}$. Then:

(f) Segment $D_M0$ into 2 levels, where $D_M00$=a value <0.5$D_M0$, and $D_M01$=a value >0.5DM0

(g) Determine, in percent, the amount of $HDR_{2nd\,processed}$ image area relative to the full image area, exceeding $D_M01$, SIZE_1

(h) Determine, in percent, the amount of $HDR_{1st\,processed}$ image area relative to the full image area, exceeding $D_M00$, SIZE_0, where SIZE_1 should be >=SIZE_0.

(i) Calculated SIZE-RATIO=SIZE_1/SIZE_0

(j) IF (SIZE_0>40%||(SIZE_RATIO>2 && SIZE_1>8%))

(k) Capture Series Images again (l) Else (m) Replace pixels of $HDR_{2nd\,processed}$ image areas exceeding $D_M01$, with their counterpart $HDR_{ref}$ pixels, resulting in $HDR_{2nd\,processed}$ mixed image data (n) End The ghost removal process can be applied to any aligned, captured bracketed exposed series of two or more images. In addition, two or more $HDR_{ref}$ images can be employed by the process. When the process is applied to a series of three images, for example, the exposure level of a first series image being lower than the exposure level of a second series image and the exposure level of the second series image being lower than the exposure level of a third series image, the areas of the regions of the second series image that correspond to mixed image data with variances that exceed the first threshold can be used to select between two reference images, $HDR_{ref1}$ and $HDR_{ref2}$. In this example, second series image region areas that are saturated are summed and a ratio of the sum of saturated area to the total area of the second series image is used to select $HDR_{ref}$ for the remainder of ghost removal processing. If the ratio is less than or equal to a parameter value, 0.03 to 1 for example, then $HDR_{ref2}$=the second series image is selected. If the ratio is greater than the parameter value, then $HDR_{ref1}$=the first series image is selected. Further, the above selection approach, or ones similar in nature that are responsive to other image characteristics, such as, for example, the size of image areas with object movement above a predetermined threshold, or spatial frequency details above a predetermined threshold, can be used to select a $HDR_{ref1}$ for the first stage of ghost removal processing and, additionally, a different $HDR_{ref2}$ for the second stage of ghost removal processing.

Figure 5:
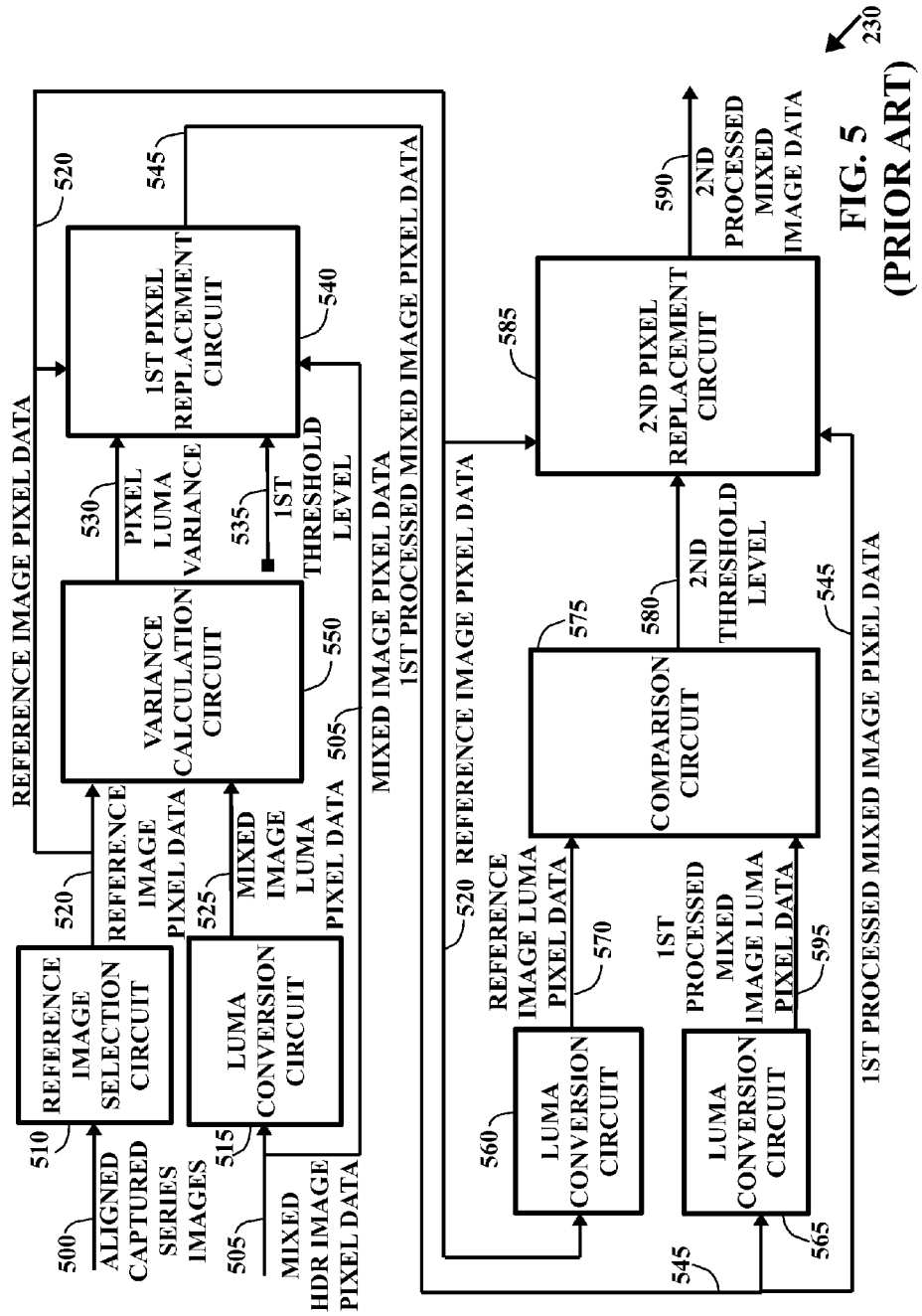
FIG. 5 is a block diagram of the Ghost Remover processing module according to embodiments of the invention.

FIG. 5 is a block diagram of an embodiment of the Ghost Remover processing module, 230 of FIG. 2. Mixed HDR Image pixel data is input to Luma Conversion Circuit 515 and First Pixel Replacement Circuit 540 on line 505 of FIG. 5. Luma Conversion Circuit 515 converts Mixed HDR Image Pixel Data to Mixed Image Luma Pixel Data and, through line 525, inputs Mixed Image Luma Pixel Data to Variance Calculation Circuit 550. Although not shown in FIG. 2, aligned images of the captured bracketed exposed series of two or more images are input to the Ghost Remover module 230 on line 500 of FIG. 5, which is connected to Reference Image Selection Circuit 510. In this embodiment, Reference Image Selection Circuit 510 selects the least exposed series image as the reference image, $HDR_{ref}$, however a Series Image exposed at a higher exposure level could be selected. Through line 520, $HDR_{ref}$ Pixel Data is also applied to Variance Calculation Circuit 550. Additionally, line 520 applies $HDR_{ref}$ Pixel Data to 1st Pixel Replacement Circuit 540, 2nd Pixel Replacement Circuit 585 and Luma Conversion Circuit 560. From the $HDR_{ref}$ Pixel Data on line 520 and Mixed Image Luma Pixel Data on line 525, Variance Calculation Circuit 550 generates output Mixed Image Luma Pixel Variance Data on line 530. This Luma Pixel Variance Data is applied to First Pixel Replacement Circuit 540 through line 530. On line 535, a 1st Threshold Level is also applied to 1st Pixel Replacement Circuit 540. From these inputs, 1st Pixel Replacement Circuit 540 replaces pixels of the Mixed Image Pixel Data on line 505, whose luma variance exceeds the first threshold level on line 535, with counterpart pixels from the $HDR_{ref}$ Data on line 520, to generate first processed mixed image pixel data, $HDR_{1st\,processed}$, on line 545, which is the output of a first stage of processing.

The first stage of processing output, $HDR_{1st\,processed}$, on line 545, is converted to $HDR_{1st\,processed}$ Luma Pixel Data by Luma Conversion Circuit 565. The output of Circuit 565 appears on line 595 and is connected to Comparison Circuit 575. $HDR_{1st\,processed}$ on line 545 is also applied to 2nd Pixel Replacement Circuit 585. Line 520 applies $HDR_{ref}$ Pixel Data to Luma Conversion Circuit 560 and 2nd Pixel Replacement Circuit 585. Pixel Data to Luma Conversion Circuit 560 converts $HDR_{ref}$ Pixel Data to $HDR_{ref}$ Luma Pixel Data, and provides the $HDR_{ref}$ Luma Pixel Data to Comparison Circuit 575 over Line 570. Comparison Circuit 575 calculates the difference between the each $HDR_{1st\,processed}$ Luma Data Pixel and its counterpart $HDR_{ref}$ Luma Data Pixel and generates a 2nd Threshold Level based on the maximum value of the differences. This 2nd Threshold Level is applied to 2nd Pixel Replacement Circuit 585 over Line 580. 2nd Pixel Replacement Circuit 585 replaces each $HDR_{1st\,processed}$ data pixel on line 545 exceeding the 2nd threshold level with its counterpart $HDR_{ref}$ data pixel on line 520, the resulting 2nd processed mixed image data, $HDR_{2nd\,processed}$, on line 590, being the ghost reduced output of a second stage of processing.

Figure 6:
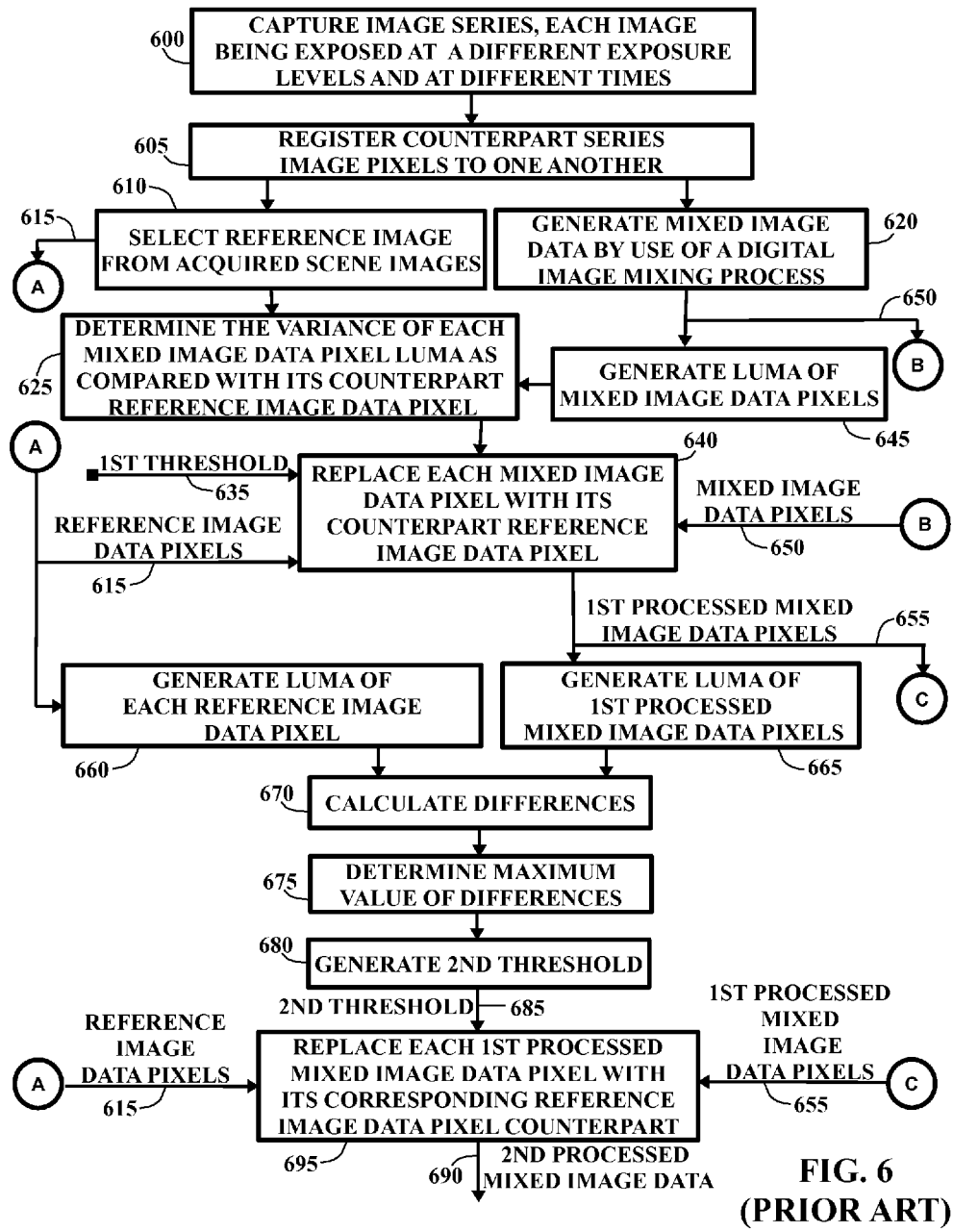
FIG. 6 is a flowchart illustrating the processing sequence of a Ghost Remover processing method.

The two stage ghost removal process used by the Ghost Remover processing module of FIG. 5 is depicted in the flowchart of FIG. 6. At Block 600, a bracketed exposed series of two or more images, each image exposed at a different exposure level and at a different time, is captured. At Block 605 these images are registered to each other such that counterpart series image pixels correspond to one another. At Block 610 a reference image is selected from the acquired scene images and its pixel data is passed onto processing Blocks 625, 640, 660 and 695 over processing path 615. The reference image chosen is often the least exposed Series Image, but may be a Series Image exposed at a higher exposure level. It does not have to be the same reference image as used by the Image Registration Processor 210, which, in general, employs a first image captured at a nominal exposure setting of the camera as a reference image to which all the other images of the series are aligned. The Image Mixer previously described, whose image mixing process is depicted in the flowchart of FIG. 4, performs the processing at Block 620, with the Mixed HDR Image Output Image Data Pixels of FIG. 4 entering processing Blocks 650 and 640. At Block 650 the Luma of Mixed Data Pixels is generated and passed onto Block 625, where the variance of each Mixed Image Data Pixel Luma from Block 650, as compared with its counterpart Reference Image Data Pixel from Block 610, is calculated. This variance is passed to processing Block 640 and used by Block 640, along with a 1st Threshold which enters processing Block 640 along path 635, Mixed Image Data Pixels from processing Block 620, which enters processing Block 640 along path 650, and Reference Image Data Pixels which enters processing Block 640 along path 615, to replace each Mixed Image Data Pixel, with a variance exceeding the 1st Threshold, with its counterpart Reference Image Data Pixel, and generate 1st Processed Mixed Image Data Pixels. 1st Processed Mixed Image Data Pixels are the result of a first stage of ghost removal processing.

1st Processed Mixed Image Data Pixels are passed to processing Blocks 665 and 695 along processing path 655. Processing Block 665 generates the Luma of 1st Processed Mixed Image Data Pixels, while processing Block 660, from Reference Image Data Pixels which enters processing Block 660 over path 615, generates the Luma of each Reference Image Data Pixel. Processing Block 670 calculates the difference, on a pixel by pixel basis, between the luma value of each 1st Processed Mixed Image Data Pixel and the luma value of its counterpart Reference Image Data Pixel and provides these differences to processing Block 675. Processing Block 675 determines the maximum value of these differences and processing Block 680 generates a 2nd Threshold based on this maximum value. Processing Block 695 receives this 2nd Threshold over path 685, along with Reference Image Data Pixels over Path 615 and 1st Processed Mixed Image Data Pixels over path 655 and replaces each 1st Processed Mixed Image Data Pixel that exceeds this 2nd Threshold with its corresponding Reference Image Data Pixel counterpart, and thus generates enhanced ghost-removed 2nd Processed Mixed Image Data on processing Path 695. This 2nd Processed Mixed Image Data, the result of a 2nd stage of ghost removal processing, is used as input to a Tone Mapping processor, such as 235 of FIG. 2.

Embodiments of the present invention are distinct over the embodiments of the parent application described above. The mixing scheme presented in the parent application was designed to operate best on a static scene, but if that proves not to be the case and there is some local motion such as a car, people, or branches of a tree moving due to blowing wind for example, a ghost might be noticed, as noted previously. A separate ghost removal process is then required. Embodiments of the present invention include a ghost removal process that improves upon the previous ghost removal process, as described below.

Figure 7:
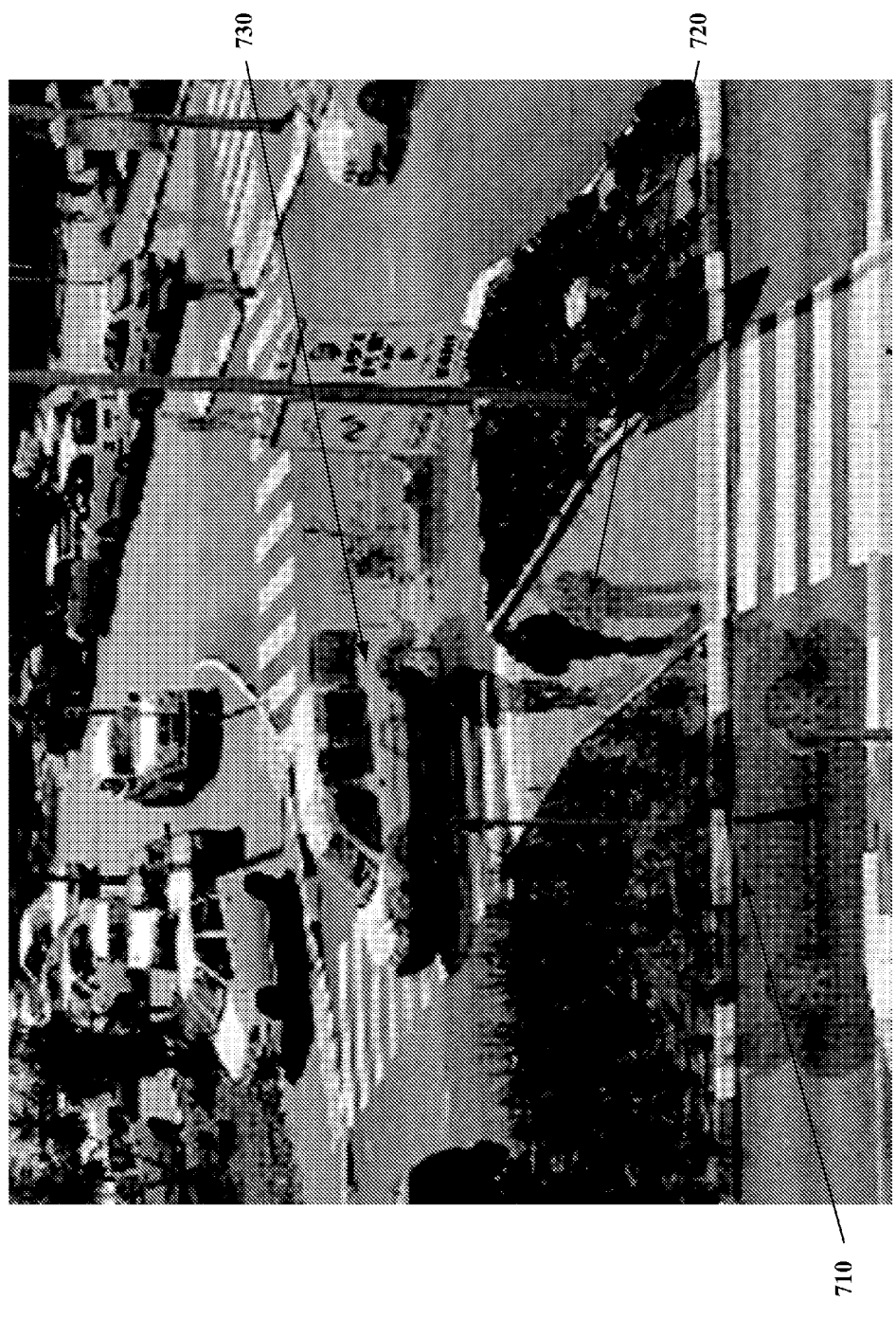
FIG. 7 is a picture having ghosts created by use of three pictures taken in sequence and composed together according to embodiments of the invention.

FIG. 7 shows a non-limiting example of the ghost generated by mixing three images taken at different times and exposures, according to an embodiment of the present invention. The ghosts, marked by the arrows 710, 720 and 730, are clearly seen and should be eliminated as much as possible. A complete elimination of the ghosts in all cases may be impossible, however the embodiments to be described eliminate the ghosts in many cases and the residual left is better than that presented by other prior art solutions.

The parent application Ghost Remover is based on the assumption that if no local motion exists, then the difference image generated from two aligned images has low amplitudes. Unfortunately, a local motion is not compensated by the registration process (which is global in nature) and thus actually appears as a high amplitude region in the difference image.

In the present application therefore, it is noted that by going through the difference image, one can locate those regions of high amplitude and replace the regular output by an original patch taken from a reference image, preferably either from the dark image or from the medium image. This replacement is carried out by again using the Image Mixer where the inputs are the HDR (with ghosts) and the reference image from which patches are taken with a proper weighting W, computed thus:

$$\text{HDRout} = (1-W) \times \text{HDR} + W \times \text{ref\_image} \quad (9)$$

The resultant HDRout image generated by this process should now be clean of ghosts.

The main steps now provided for generating the weighting W are given hereby:

(a) Downscale the (typically, but not necessarily, three) input images' lumas to, for example, approximately 180×240 resolution.

(b) Normalize the lumas to a specific standard deviation and mean.
(c) Generate d=abs(dark_luma−medium_luma)>Threshold difference image
(d) Generate d1=abs(bright_luma−medium_luma)>Threshold difference image
(e) Generate a binary image G=(d OR d1)
(f) Dilate, filter and upscale G to generate a smoothed version of W for use by the image mixer.

Figure 8:
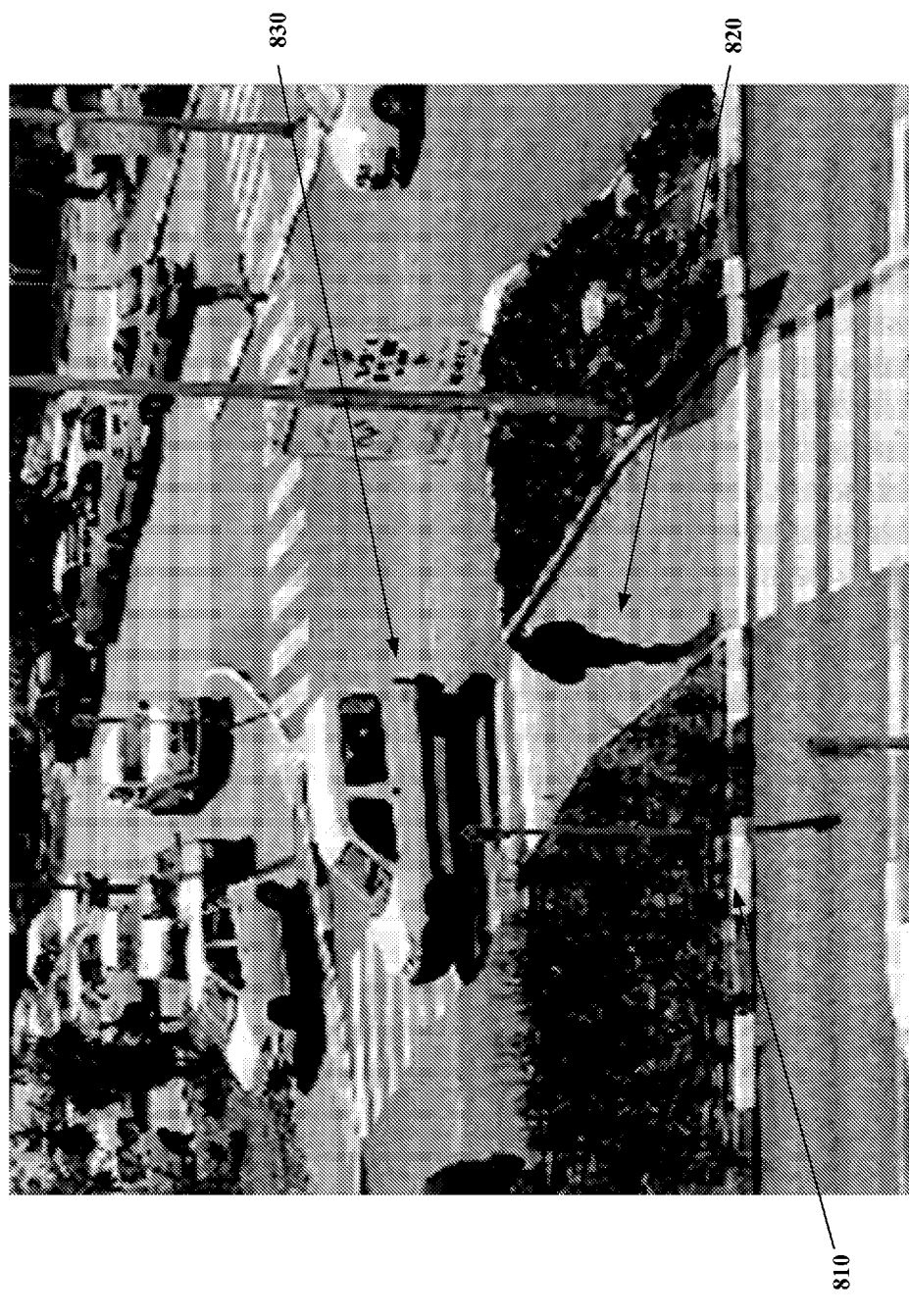
FIG. 8 is the picture of FIG. 7 after removal of the ghosts according to embodiments of the invention.

In FIG. 8, a non-limiting example of the resultant ghost-free mixing according to an embodiment is provided. The arrows 810, 820 and 830 point to the respective areas previously pointed to by arrows 710, 720 and 730 respectively in FIG. 7. The ghosts of a moving person and moving vehicles have been essentially completely removed. It should be noted that this procedure overcomes registration noise as well. For instance, if an edge of a door is not aligned correctly, the difference between aligned images would be high. Consequently, the edge is replaced by a patch taken from the reference image. Hence, it makes no difference to the ghost removal process of the present application where the noise is coming from, e.g. either from a local motion or from misregistration. In both cases it is replaced by a patch.

Choosing the Reference Image for Patch Implants

In general it is preferable to take the replacing patches from a higher exposure image (typically the medium image for a series of three images), however, these patches may consist of saturated regions. If this is the case, a patch from the darkest image may be taken. The criteria for selection of patches from the medium image is based upon calculation of the total percentage of the saturated regions given the total patches' area. If this is less than 3%, for example, the medium image serves as the reference image from which patches are taken, otherwise, the dark image is taken. The disadvantage of using patches from the dark image is that the dark image has the lowest signal-to-noise ratio and is noisy. This noise is magnified by the final tone mapping.

Figure 9:
FIG. 9 is a picture requiring HDR processing according to embodiments of the invention.
Figure 10:
FIG. 10 is a picture with labels corresponding to the picture of FIG. 9 according to embodiments of the invention.
Figure 11:
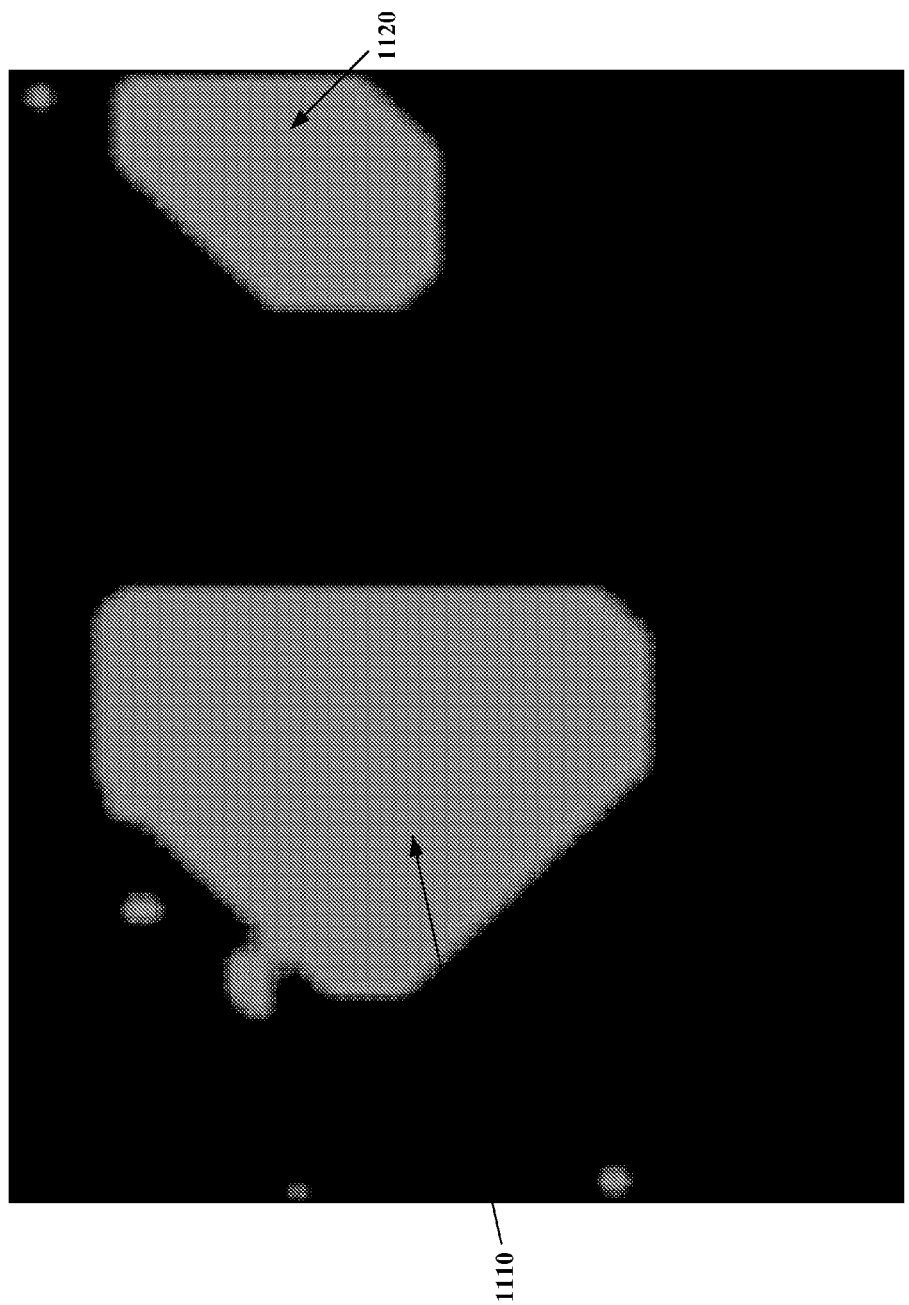
FIG. 11 is a picture with patch selection corresponding to the picture of FIG. 9 according to embodiments of the invention.

The decision for selecting the patch (from either the dark image, the bright image or the medium image in the typical case where there are three input images available) is done per image segment and not on the full image. This requires the binary connected image G to be segmented first. For that purpose, an exemplary and non-limiting image according to an embodiment as shown in FIG. 9 is used, which is the medium image. FIG. 10 shows the same image after segment labeling, where labels 1010 and 1020 correspond to labels 910 and 920 respectively of FIG. 9. In FIG. 11 the medium patch 1110, and the dark patch 1120, are shown, corresponding to labels 910 and 920 respectively.

According to embodiments of the present invention the patching process therefore comprises:
(a) Labeling—Finding sets of connected binary blobs and assigning a color to each (FIG. 10).
(b) Polygon Bounding—Bounding each segment by a polygon, such as an octagon for example.
c. Patch selection—Checking each polygon's region to determine whether more than (typically) 3% of its area is saturated in the medium image. For saturated segments, dark image patches were taken, while for non-saturated segments medium image patches were taken.

Polygon bounding is known in the art, but is described here. A linear container is one whose interior is specified by a finite number of linear inequalities. For example, in 2D, a container Z could be specified by k inequalities: $f_i(x,y)=a_ix+b_iy+c_i<0$ (i=1,k), all of which would have to be true for a point (x,y) to be in the region. If any one of the inequalities failed, then the test point would be outside Z.

Figure 12:
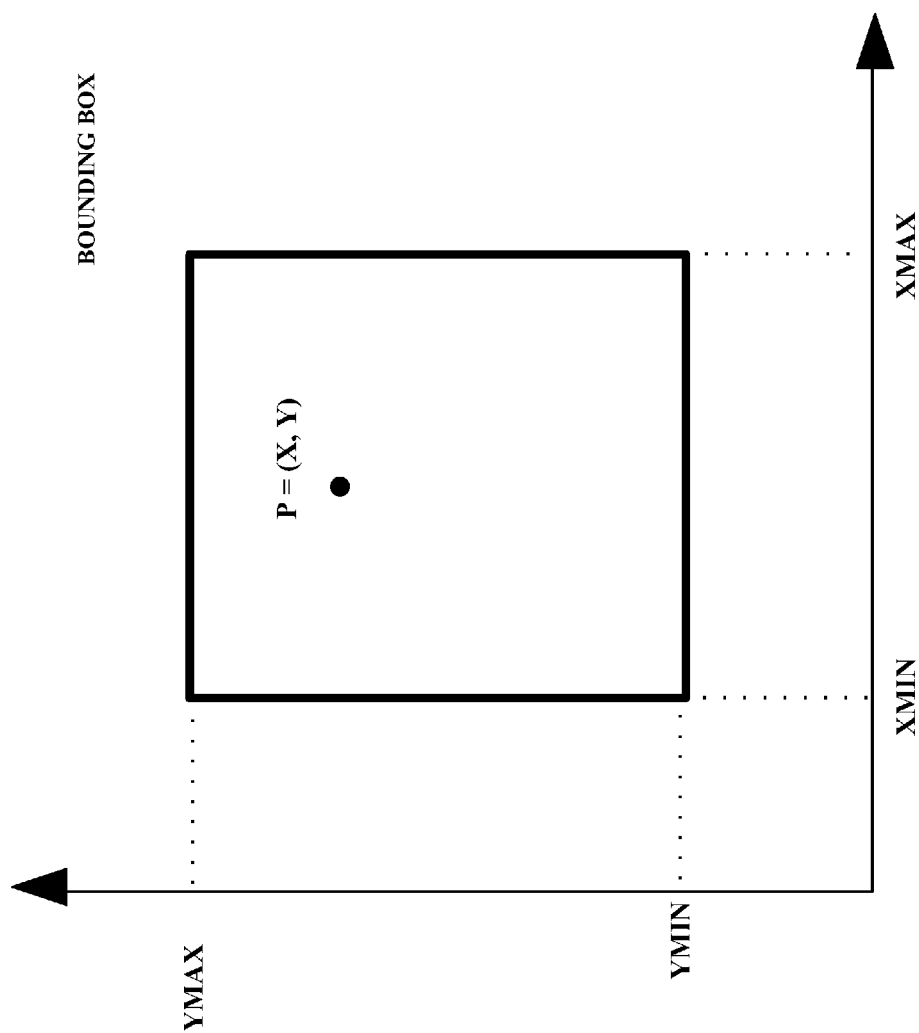
FIG. 12 depicts a bounding box for pixel patches according to embodiments of the invention.

Referring now to FIG. 12, a box is a rectangular region whose edges are parallel to the coordinate axes, and is thus defined by its maximum and minimum extents for all axes. So, a 2D box is given by all (x,y) coordinates satisfying $x_{min} \le x \le x_{max}$ and $y_{min} \le y \le y_{max}$. Inclusion of a point P=(x,y) in a box is tested by verifying that all inequalities are true; if any one of them fails, then the point is not inside the box. In 2D there are 4 inequalities, and on average a point will be rejected after 2 tests.

The "bounding box" of a 2D geometric object is the box with minimal area that contains the object. For any collection of linear objects (points, segments, polygons, and polyhedra), their bounding box is given by the minimum and maximum coordinate values for the point set S of the object's vertices: ($x_{min}$, $x_{max}$, $y_{min}$, $y_{max}$). These values are easily computed in O(n) time with a single scan of all the vertex points, sometimes while the object's vertices are being read or computed. The bounding box is the computationally simplest of all linear bounding containers, and the one most frequently used in many applications. At runtime, the inequalities do not involve any arithmetic, and only compare raw coordinates with the precomputed min and max constants.

Figure 13:
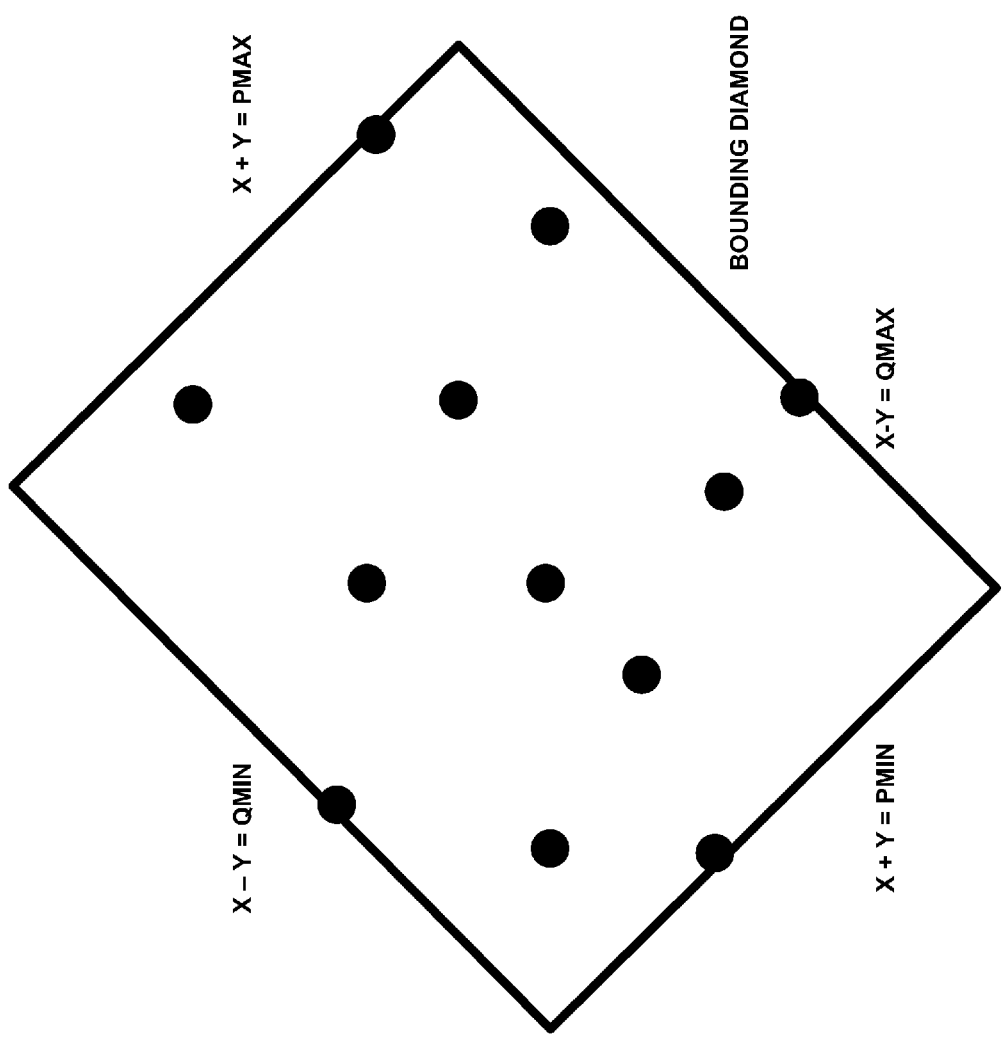
FIG. 13 depicts a bounding diamond for pixel patches according to embodiments of the invention.

Referring now to FIG. 13, after some arithmetic, the simplest nontrivial expressions are those that just add and subtract raw coordinates. In 2D, we have the expressions p=(x+y) and q=(x−y) which correspond to lines with slopes of (−1) and 1. For a 2D set S of points, we can compute the minimum and maximum over S of each of these two expressions to get ($p_{min}$, $p_{max}$, $q_{min}$, $q_{max}$). Then, the "bounding diamond" for the set S is the region given by coordinates (x,y) satisfying the inequalities: $p_{min} \le (x+y) \le p_{max}$ and $q_{min} \le (x-y) \le q_{max}$. Geometrically, it is a rectangle rotated by 45 degrees and resembles a diamond.

The "bounding diamond" involves a bit more computation than the bounding box. However, after computing them both, one may be found to be better than the other. All the minimums and maximums involved (8 of them) can be computed in O(n) time with a single scan of the set S, and then the areas of the bounding box B and the bounding diamond D can be compared, and the smaller container can be used if desired. Since everything is rectangular, we have Area(B)=($x_{max}$−$x_{min}$)*($y_{max}$−$y_{min}$), and Area(D)=($p_{max}$−$p_{min}$)*($q_{max}$−$q_{min}$).

Figure 14:
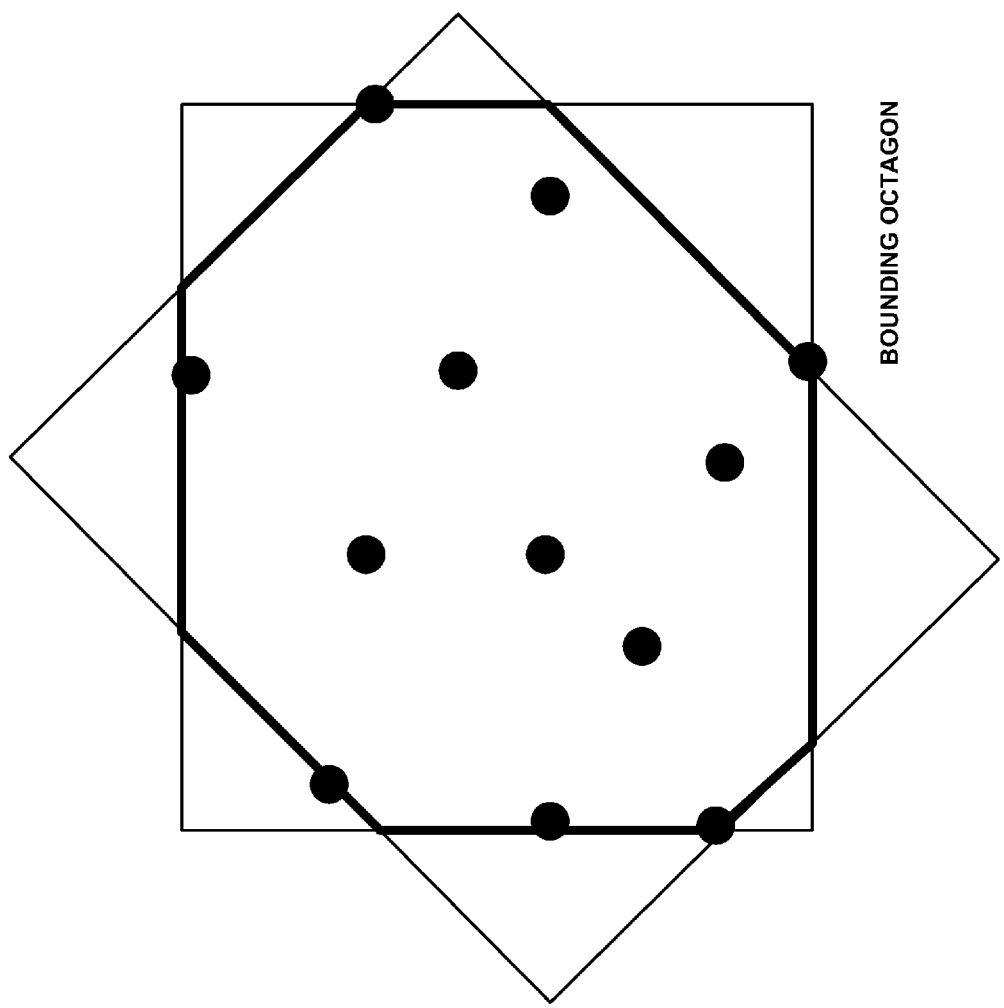
FIG. 14 depicts a bounding octagon for pixel patches according to embodiments of the invention.

Further, one could use both containers, the box and the diamond, to get an even smaller combined "bounding octagon" defined by all 8 inequalities as shown in FIG. 14. Typically one tests for inclusion or intersection with the bounding box first, and then the bounding octagon second. If one wants to test a point P=(x,y) for inclusion in a polygon Z, the only overhead is computing the expressions (x+y) and (x−y) just before testing the diamond inequalities after P was found to be inside the bounding box.

Hence, given the HDR image with ghosts, the ghost-free image (HDRout) for the three-image bracketing case (which is the most common case) is generated by two mixings as follows:

HDRout=HDR(1−Wd)+Wd×Dark_image+HDR(1−Wm)+Wm×Medium_Image (10)

The weights Wd and Wm are determined from the bounding octagons of the respective segments after some smoothing.

Note that the embodiments of the present invention using this ghost removal process are different from embodiments described in the parent application in that pair-wise whole image blendings to accumulate a relatively ghost-free composite image are not required. Instead, troublesome image regions are identified and replacement patches are blended in from similar regions in available alternate images.

The Tone Mapping Process

The enhanced ghost-removed image is 16 bits in bit-width and comprises three color components, a red component, a green component and blue component. This RGB 16-bit data is to be displayed on Built-In Digital Camera Display 245 of FIG. 2, which is an 8-bit display, so the enhanced ghost-removed image needs to be converted from 16-bit RGB data to 8-bit RGB data. The process of converting image data of one bit-width to that of a narrower bit width, such as from 16 bits to 8 bits, while maintaining the relative gray shade levels represented in the wider bit-width data in the resulting 8 bit data, is referred to as "Tone Mapping". There are many such Tone Mapping processes that can be used. This embodiment of the invention employs a unique tone mapping approach which was originally designed to map 12 bit wide image data to 8 bit wide image data. Therefore, this approach first removes the 4 least significant bits of the 2nd Processed Mixed Image Data, leaving 12-bit RGB image data. Three Look-Up tables (LUTs) are used to map the remaining 12-bit RGB data to the needed 8-bit RGB data:

A Normal Gain LUT,
A High Gain LUT; and
A Very High Gain LUT

The proper LUT to use in the 12-bit to 8-bit tone mapping process needs to be selected in order to correctly represent the image gray shades presented in 8-bit data form. The selection criteria depends on the size of image area populated with pixels whose value, on average, is below a predefined pixel value, or "dark", as compared to the rest of the image area. The lower the average pixel value in the image dark area, the higher the gain of the LUT selected.

The process of LUT selection is as follows:
1. Shift right the 12-bit RGB image by 4 bits. This results in an 8-bit image;
2. Generate the luma component of the resulting 8-bit image;
3. Calculate the average value, Mn, of all pixels in the 8-bit image whose luma is less than a threshold for dark area, Td. A digital value of 20 out of a maximum digital value of 255 (the maximum 8-bit value) can be used for Td;
4. If the sum of all the pixels having luma <Td is less than an area threshold, P %, use the Normal Gain LUT, Otherwise:
5. Given Mn and predefined Thresholds pixel value thresholds T1 less than T2:
6. If Mn<T1 use the Very High Gain LUT;
7. If Mn is between T1 and T2 use the High Gain LUT
8. If Mn>T2 use the Normal Gain LUT Td=20 out of 255, T1=5 out of 255 and T2=10 out of 255 are examples of the Thresholds that can be employed in the above Tone Mapping LUT selection process.

The tone mapping procedure employed by this embodiment is designed to boost image regions of low illumination, while the three LUTs behave the same for image regions of high illumination. It was found that this provides a good result when applied to the generated ghost-free HDR.

Thus, to summarize, the improved HDR solution of the parent application increases the dynamic range of a given scene, by fusing and merging the information of three different images of a given scene. Each image is captured with a different exposure setting, e.g., nominal exposure, over-exposure and under-exposure. The under-exposed image may be referred to as the dark image, the nominally-exposed image may be referred to as the medium image and the over-exposed image may be referred to as the bright image.

The HDR algorithm enhances the dynamic range of the scene by performing the following:

Dark areas in the medium image are replaced with pixels from the bright image, for brightening and detail enhancement of the scene.

Saturated areas in the medium image are replaced with pixels from the dark image, for recovery of burned out details.

Figure 15:
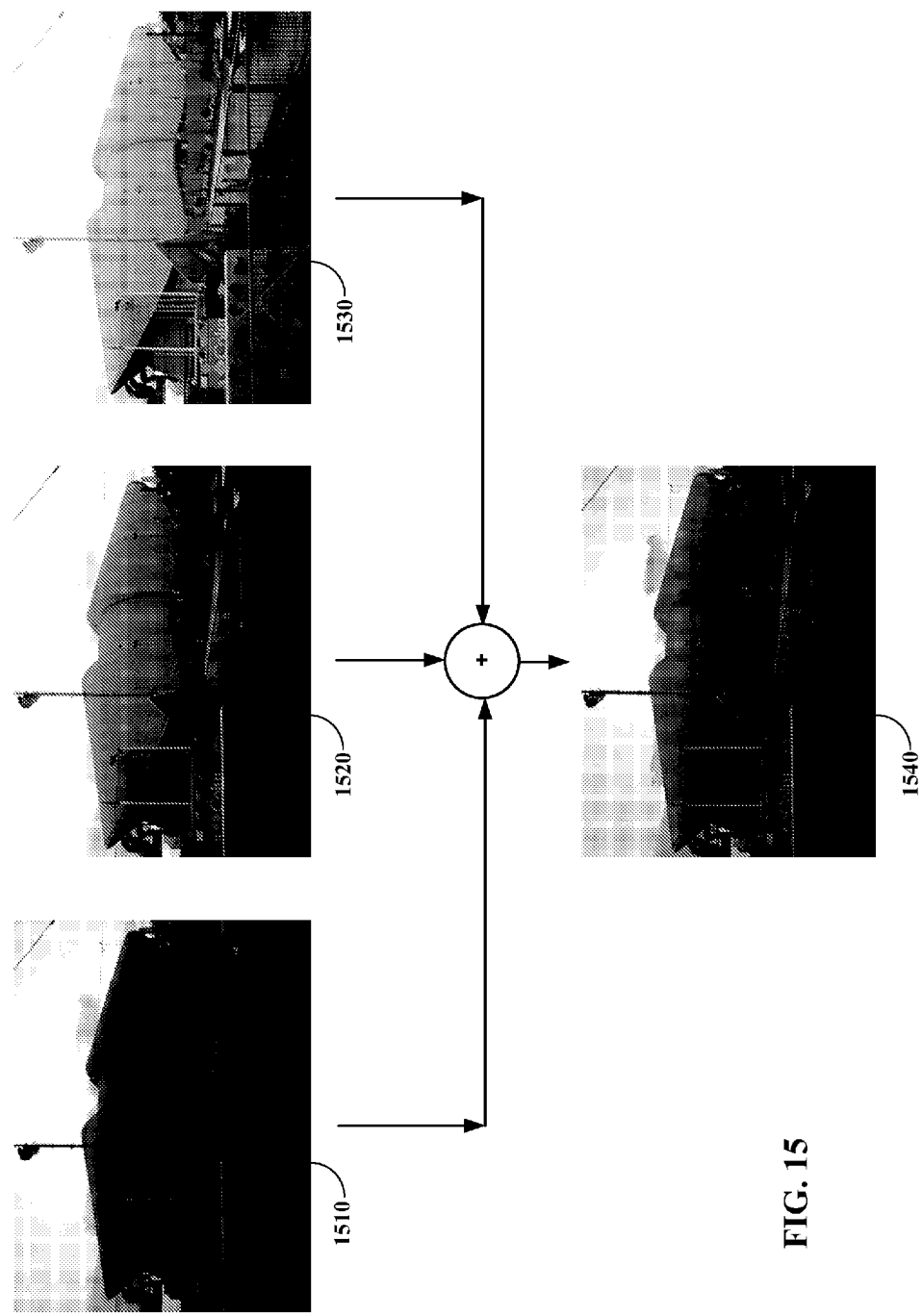
FIG. 15 is a demonstration of the process of HDR according to embodiments of the invention.

The overall methodology of the embodiments of the contrasting present invention are now summarized. In FIG. 15, an exemplary and non-limiting implementation of the HDR is shown according to an embodiment. While shown in black-and-white format to conform with USPTO application constraints, this should not be viewed as limiting upon the embodiments of the present invention; all images may be in full color without departing from the invention. Further, any number of images may be input, though three is typical. Three input images with different exposures, e.g. image 1510 which is the dark image, image 1520 which is the medium image, and image 1530 which is the bright image, are fused together for the creation of a high dynamic range result shown in image 1540.

Figure 16:
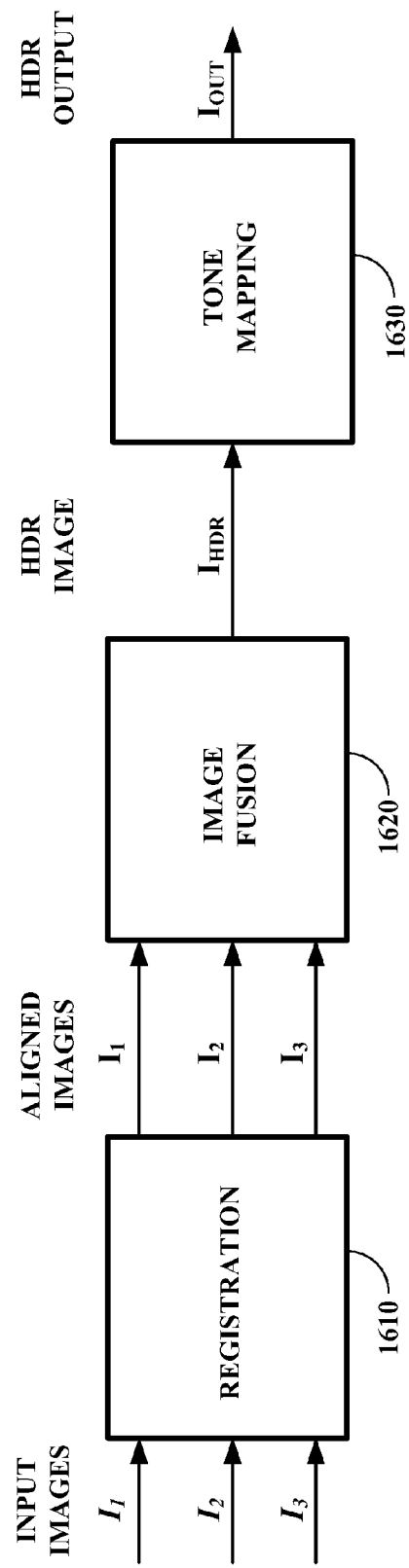
FIG. 16 is a demonstration of the HDR algorithmic flow according to embodiments of the invention.

The HDR algorithm now comprises three main stages that are shown with respect of FIG. 16. The three stages are:

an Image Registration stage 1610 for aligning the three input images;

an Image Fusion stage 1620 for mixing the three aligned images together for the creation of a high dynamic range image, as well as an integrated ghost removal, using the principles explained in greater detail above;

a Tone Mapping stage 1630 for mapping the high dynamic range result into an 8-bit range, typically needed in order to display the result on common display devices, however should not be viewed as limiting the scope of the present invention.

The goal of image registration is to align the three images to the same set of coordinates. In order to align the images, two registration procedures are incorporated: the first aligns the dark image with the medium image, and the second aligns the bright image with the medium image.

The registration stage 1610 identifies and compensates for the global motion of the scene between two different captured frames. This stage is needed for the HDR algorithm since it is assumed that the camera is handheld, and thus may suffer from the effects of shaky holding. The alignment scheme consists of four stages:

Motion vector extraction—a set of motion vectors are extracted between the two images;

Global motion estimation—a global transformation model, usually, but without limitation, affine, is assumed between the images. A random sample consensus (RANSAC) algorithm is applied on the motion vectors in order to estimate the most probable transformation parameters;

Image warping—according to the estimated global transformation, typically a hardware based warping mechanism transforms the dark or bright image onto the medium image coordinates; and, Unified Field of View—due to the camera motion, there may be some differences between the images' fields of view. At this stage, the maximal field of view that exists in all three images is computed, while preserving the original aspect ratio of the input images.

Figure 17:
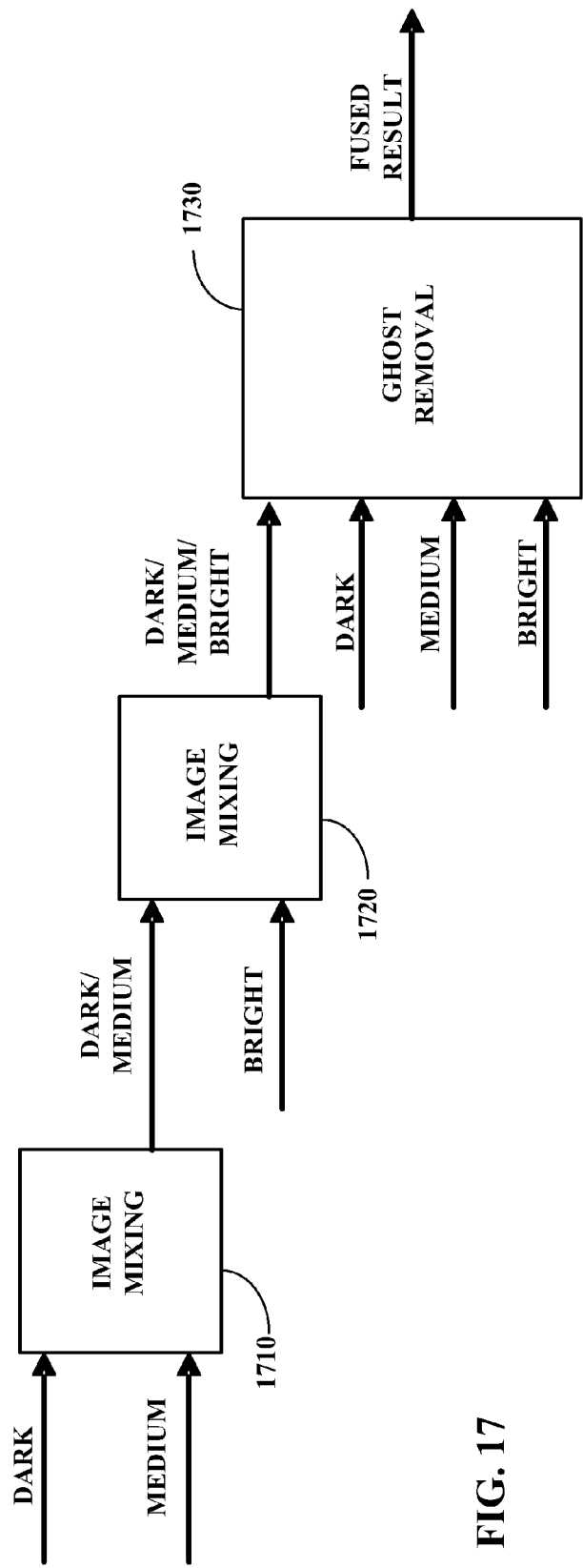
FIG. 17 is a demonstration of the image fusion algorithmic flow according to embodiments of the invention.

The image fusion stage 1620 mixes the three images together (stage 1620 is shown in greater detail in FIG. 17). The mixing is performed as follows: using the medium image as reference for example, the dark image contributes information in over-exposed (1710) areas and the bright image contributes information in under-exposed areas (1720). This mixing rule is used when the scene is static as noted before. However, when local motion exists in the scene, as shown in certain examples above, the mixing may lead to visible artifacts in the HDR result, known as ghost artifacts. In order to overcome these motion-related artifacts, a ghost treatment mechanism (1730) is applied as part of the image fusion stage.

The image mixing basic operation gets two images with different exposures and blends them together according to a pixel-wise blend factor. In order to describe the steps of the image mixing procedure, denote the image which is less exposed as $I_1$ and the image with greater exposure as $I_2$. The exposure value of each image will be denoted as $ExpVal_1$ and $ExpVal_2$ respectively. The exposure value in computational photography is calculated according to the following formulation:

$$ExpVal = \frac{ISO \cdot ExpTime}{F_\#^2}$$

Where ISO represents the ISO level, ExpTime represents the exposure time and $F_\#$ represents the F-number of the optical system.

The following stages are applied within the image mixing scheme. Firstly a preprocessing stage comprising of:

If $I_1$ or $I_2$ are given in the gamma domain (not in the linear domain), then a degamma operation is applied in order to represent the input images in the linear domain; and, The brighter image, $I_2$, is normalized to the exposure value of the darker image, $I_1$. The manipulations on the input image can be summarized as:

$$\begin{cases} I_1^{upd} = DeGamma(I_1) \\ I_2^{upd} = DeGamma(I_2) \cdot \frac{ExpVal_1}{ExpVal_2} \end{cases}$$

Secondly the calculation of blending weights takes place. In order to determine the weights, the luminosity values (luma, which will be denoted as Y) of the brighter image, $I_2$, are used as an input to a weighting LUT. This can be formulated as $W=LUT(Y_2)$. The Weighting LUT can be described as a general mapping, but is usually implemented as piecewise linear function, such as is shown in FIG. 18, where the piecewise linear graph 1810 is shown.

Lastly, the mixing is performed, where the actual mixing operation is performed according to the following formulation:

$$I_{out} = (1-W) \cdot I_1^{upd} + W \cdot I_2^{upd}$$

Figure 18:
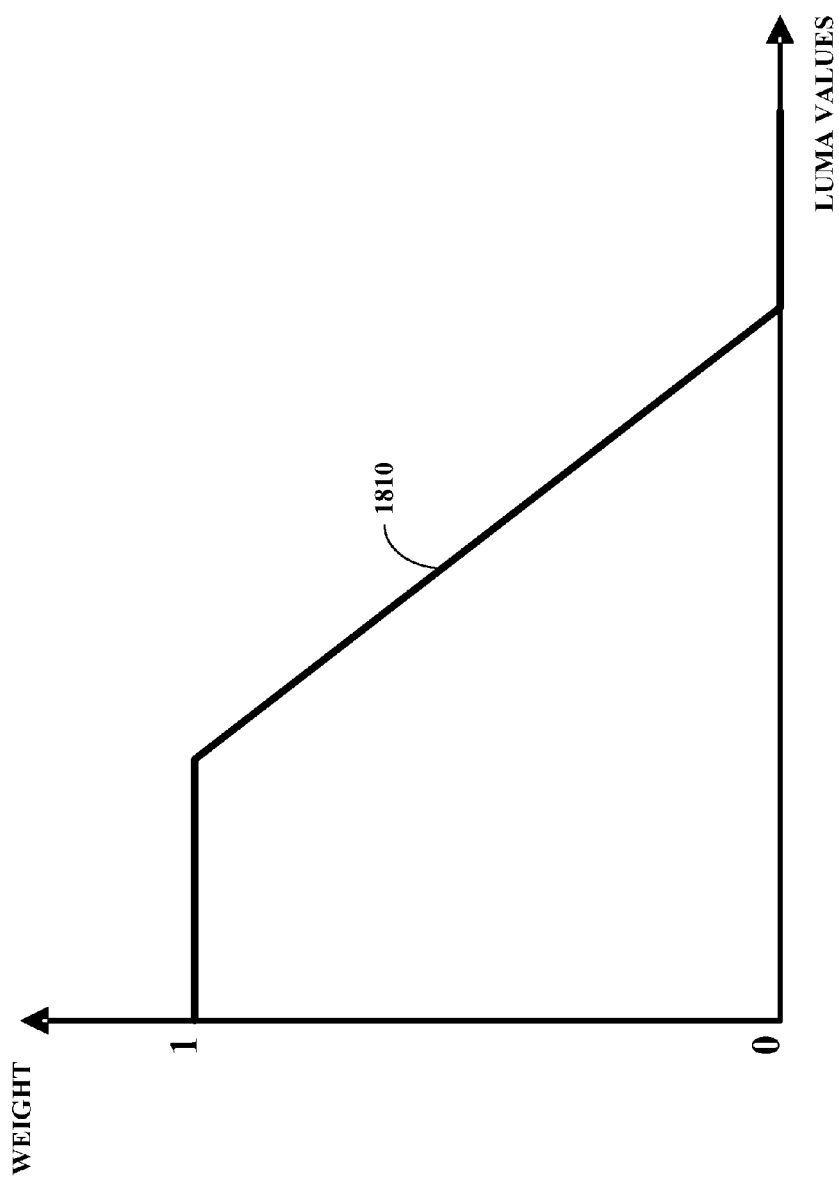
FIG. 18 is an example of a piece-wise linear function for a weight lookup table according to embodiments of the invention.

When the example in FIG. 18 is used as the weight LUT, the mixing operation takes dark pixels from $I_2^{upd}$, bright pixels from $I_1^{upd}$ and performs pixel-wise blending between the two images for medium luma values. Note that any images from the series may be processed in any order, unlike the embodiments of the parent application.

Figure 19:
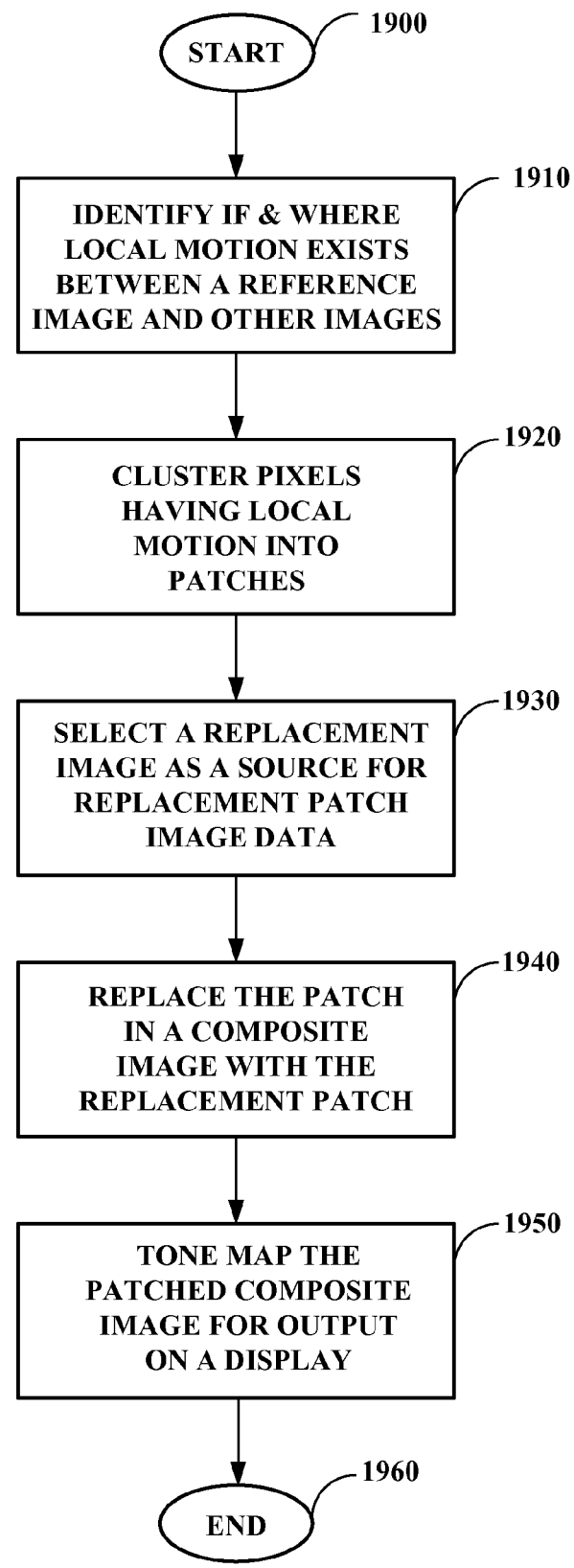
FIG. 19 is a demonstration of the ghost removal flow according to embodiments of the invention.

According to one embodiment of the present invention a ghost removal solution is provided below, as shown in FIG. 19. The ghost treatment mechanism aims to identify areas with local motion between the three HDR inputs. In these areas, the HDR fusion results must not contain a blend of the images, since this may lead to ghost artifact, e.g., a walking person may be seen twice or more as was shown in FIG. 7. Instead, only a single image is chosen to represent the HDR fusion result in the specified area (i.e. a patch). Accordingly, the ghost treatment mechanism has the following stages, beginning at step 1900:

Motion detection—identifying if local motion exists between the HDR input images. This stage is performed per pixel, beginning at step 1910;

Defining ghost patches—in this stage, the pixels that suffer from motion are clustered into patches (image blobs) using morphological operations, beginning at step 1920;

Patch selection—each of the identified patches must be represented by a single input image. In this stage, a score function is used in order to decide if the information will evolve from the exemplary bright, medium or the dark image, beginning at step 1930; and Patch correction—in this stage, typically a hardware based patch correction is used in order to replace the ghost patch with the selected input image, beginning at step 1940.

Hereafter each of the four stages will be discussed in more detail, starting with the motion detection stage. Following the image registration stage that fuses the dark and bright images onto the medium image coordinates, the motion detection scheme attempts to identify differences between the three aligned images. The underlying assumption is that these changes may evolve from motion in the scene.

In order to efficiently identify local motion, a downscaled version of the aligned images may be used, e.g. for 12 megapixel images a 1:16 downscale factor is typical. At this stage any kind of difference detection algorithm may be used in order to identify which pixels are different between the images. A simple detection scheme differentiates between images in pairs, i.e., Medium and Dark and Medium and Bright, and may include the following steps:

Calculating STD (Standard Deviation) and mean for each downscaled image;

Normalizing the images in order to have the same STD and mean for each downscaled image;

Creating an absolute difference map of the two downscaled images; and,

Using a threshold on the difference map in order to distinguish between actual detections and registration noise.

This method, though simple and straightforward, may result in an unreliable and noisy difference map under certain conditions. For example, in saturated areas, the bright image histogram is highly saturated (most pixels values are near 255), while the medium image histogram is only partially saturated (only a portion of the pixels are near 255). Due to the clipping of the image intensities (in the bright image) a bias may be introduced into the STD and mean calculations of the bright image. Moreover, the difference map may identify the difference between the clipped pixel in the bright image and the partially saturated pixel in the medium image as detection, regardless of the presence of moving objects.

Therefore a more sophisticated motion detection scheme that produces superior motion detection performance than the one described above is described for additional embodiments of the present invention. This method relies on the assumption that within the HDR framework, the bright image may only influence darker areas while the dark image may influence brighter areas. Hence there is no need to use the information from the unnecessary image in the motion detection scheme. This motion detection algorithm follows these stages:

(a) Two luminosity thresholds are defined:
BrightTH—information from the Bright image is used if the luminosity values are in the range [0, BrightTH], and
DarkTH—information from the Dark image is used if the luminosity values are in the range [DarkTH, 255].

(b) Defining a difference threshold function:
Instead of using a single threshold value for the entire difference map, a threshold function is used where the threshold, in this case, is dependent on the pixel's luminosity, such that higher threshold will be used for higher lumas and vice versa.

(c) Processing the difference map of the Bright and Medium image:
Pixel classification: considering only pixels with luminosity values in the range [0, BrightTH], the pixels are denoted as BM_Pixels (Bright Medium Pixels);
Calculating STD and mean on the set of BM_Pixels;
Normalizing the BM_Pixels in both images in order to have the same STD and mean for each image;
Creating an absolute difference map of the BM_Pixels; and
Using the threshold function on the difference map in order to identify detections.

(d) Processing the difference map of the Dark and Medium image:
Pixel classification: considering only pixels with luminosity values in the range [DarkTH, 255], the pixels are denoted as DM_Pixels (Dark Medium Pixels);
Calculating STD and mean on the set of DM_Pixels;
Normalizing the DM_Pixels in both images in order to have the same STD and mean for each image;
Creating an absolute difference map of the DM_Pixels; and
Using the threshold function on the difference map in order to identify detections.

(e) The final detection map is obtained as a union of the Dark-Medium detections and the Bright-Medium detections.

While the description above discusses two images with respect to a reference image, it should be understood that more than two may be used without departing from the teachings of the invention. For example, if five images are used, e.g., Brightest, Bright, Medium, Dark and Darkest, different mixes may be made with respect to the Medium image to achieve desirable results.

Following the motion detection stage, several pixels are typically identified as inconsistent in terms of luminosity values. The objective is to cluster these detections into patches (or image blobs). The transform of the detected pixels into an entire image patch allows for a consistent ghost treatment for neighboring pixels at the cost of identifying pixels without motion as detections. A non-limiting clustering technique, which is simple yet effective, for determining the ghost patches is:

(a) Applying a morphological dilation operation on the binary image of the detections, with a structuring element, such as a 5×5 square structuring element for example;

(b) Applying a morphological close operation on the binary image of the detections, with a structuring element, such as a 5×5 square structuring element for example;

(c) Applying a Binary labeling algorithm in order to distinguish between different ghost patches; and, (d) For efficient software implementation, describing each ghost patch by its bounding octagon.

In accordance with embodiments of the present invention, the patch selection stage decides on the most suitable input image for the replacement of the identified patch. A wrong selection for the patch may result in visible artifacts at the border of the patch area. There are several heuristics that assist in selecting the most suitable input image:

The patching artifact is more visible in flat areas than in areas with details or texture. The Human Visual System shows higher sensitivity to image changes in DC (e.g. undetailed or "flat") areas in comparison to areas with additional high pass content (texture, edges, etc.).

The patch selection should be as consistent as possible with the blending decisions at the border of the patch. By following this rule, the patch is better tailored with its vicinity.

Patching artifacts are especially visible when the border pixels are over-exposed or under-exposed.

If some of the pixels are over-exposed and some are under-exposed, the majority of pixels should influence the input image selection. For example, if there are significantly more over-exposed pixels than under-exposed pixels in the border of the patch then the dark image should be chosen, and vice versa when applicable.

Figure 20:
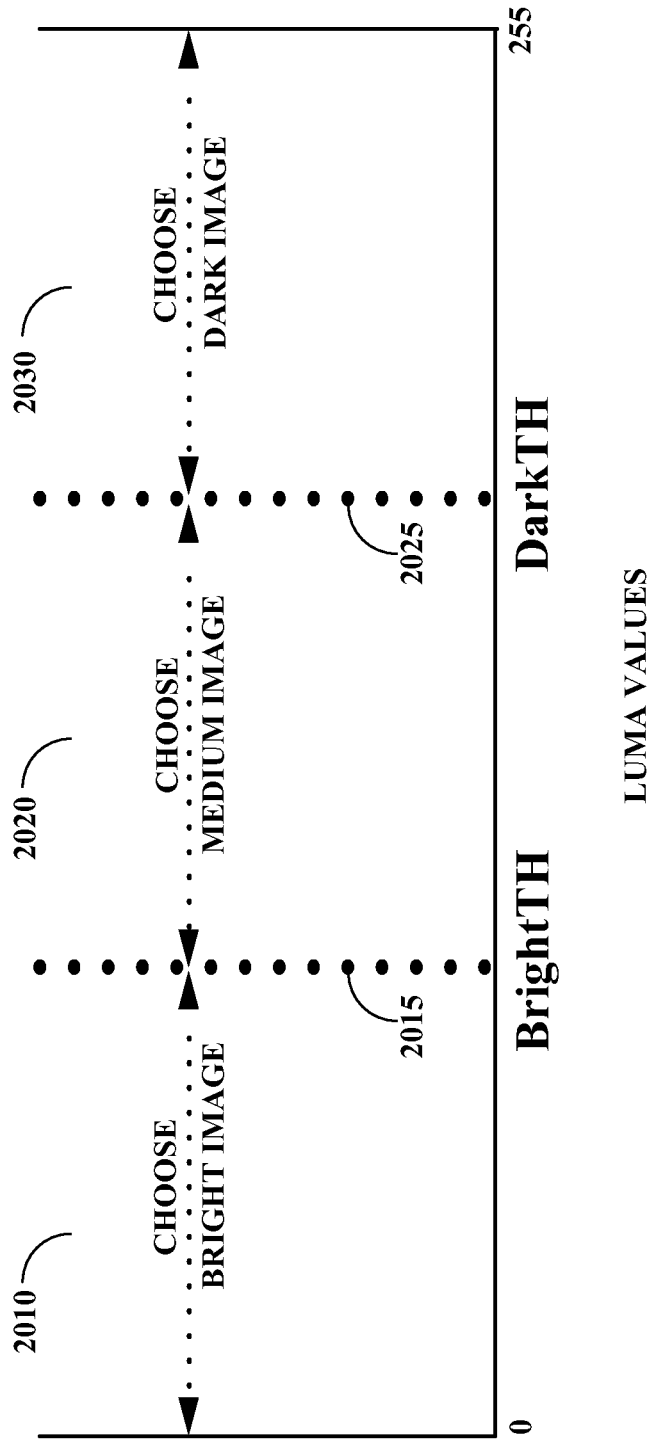
FIG. 20 is a diagram depicting an exemplary division of the medium image histogram into three distinct regions according to embodiments of the invention.

Based on these heuristics, the patch selection algorithm robustly selects the most suitable input image for the replacement of the ghost patch. The patch selection algorithm is based on histogram analysis of the medium downscaled image luminosity values, as shown in FIG. 20. The basic idea is to divide the histogram into three distinct areas: under-exposed area 2010, in which the Bright image is chosen, the correctly exposed area 2020, in which the Medium image is chosen and the over-exposed area 2030, in which the Dark image is chosen. As in the motion detection algorithm, pre-defined thresholds, BrightTH 2015 and DarkTH 2025, define the three areas 2010, 2020 and 2030. If more images are used then additional threshold values may be used without departing from the spirit of the invention.

According to this embodiment, prior to the actual algorithmic description, several parameters are defined:

RangeB, RangeM, RangeD=the luminosity range of each of the three histogram regions and described as:

$$\begin{cases} RangeB = [0, BrightTH] \\ RangeM = [BrightTH + 1, DarkTH - 1] \\ RangeD = [DarkTH, 255] \end{cases}$$

RangeSizeB, RangeSizeM, RangeSizeD=the size of the luminosity range of each region.

NumPixelsB, NumPixelsM, NumPixelsD=the number of pixels in each region.

EffNumPixelsB, EffNumPixelsM, EffNumPixelsD=the number of pixels in each region, while also considering the size of each region, which can be formulated as:

$$\begin{cases} EffNumPixelsB = NumPixelsB \cdot \frac{RangeSizeB}{RangeSizeB + RangeSizeM + RangeSizeD} \\ EffNumPixelsM = NumPixelsM \cdot \frac{RangeSizeM}{RangeSizeB + RangeSizeM + RangeSizeD} \\ EffNumPixelsD = NumPixelsD \cdot \frac{RangeSizeD}{RangeSizeB + RangeSizeM + RangeSizeD} \end{cases}$$

ModeB, ModeM, ModeD=the luminosity value in each histogram region in which the histogram is maximal.

DiffB, DiffM, DiffD=the average difference of the histogram entries from the Mode luminosity value for each histogram region. i.e.:

$$DiffB = \frac{1}{NumPixelsB} \cdot \sum_{i \in RangeB} Hist(i) \cdot |i - ModeB|^p$$

Where Hist(i) represents the histogram frequency for the $i^{th}$ luminosity value and p defines the difference metric (best results were obtained with p=1 or 2). It should be understood that DiffM and DiffD can be represented in a similar manner.

In accordance with this embodiment, the patch selection algorithm comprises the following stages:

(a) Computing a weighted histogram of the luminosity values of pixels in the border areas of a specific patch within the downscaled medium image. The histogram is weighted in the sense that pixels with over-saturated or under-saturated luminosity values have a bigger impact on the histogram frequency counts. This way over-exposed and under-exposed regions of the histogram have more effect on the patch selection algorithm, thereby overcoming the associated artifacts.

(b) Dividing the histogram into three regions according to BrightTH, DarkTH parameters.

(c) Performing the following calculations: calculating the range size for each histogram region (RangeSizeB, RangeSizeM, RangeSizeD); calculating the number of pixels for each histogram region (NumPixelsB, NumPixelsM, NumPixelsD); calculating the effective number of pixels for each histogram region (EffNumPixelsB, EffNumPixelsM, EffNumPixelsD); calculating the mode of the histogram in each histogram region (ModeB, ModeM, ModeD); and, calculating the average difference from the mode in each histogram region (DiffB, DiffM, DiffD).

(d) Calculating a score function for each histogram region. The score function for the Bright image selection is defined as:

$$ScoreB = \frac{EffNumPixelsB}{DiffB}$$

Score functions for the Medium and Dark selections are similarly defined. Moreover, similar techniques can be used if more than three images are used and adapted thereto, without departing from the scope of the invention.

(e) Following the calculation of all three score functions, the region with the maximal score defines the patch selection outcome. The score function contains a division of two calculated measurements, described below, though a person with ordinary skill in the art would readily appreciate that other score functions are possible without departing from the scope of the invention:

EffNumPixelsB—if the patch's border consists mainly of pixels with low luminosity values (thus, in the Bright range of the histogram) then the bright image is chosen. Rather than using the number of pixels by itself, a weighted version of it that also takes into consideration the size of each histogram range (effective number of pixels) is used; and, DiffB—As discussed above with respect of the patch selection heuristics, that if facing a possible artifact, then it is preferred that such an artifact appears in an area with visible texture or details and not in flat areas. Measurement of the amount of "flatness" via the patch border histogram is therefore necessary. In each histogram region, a Diff value is calculated to measure how scattered the histogram actually is. Smaller Diff values suggest that the border pixels (that are part of the same histogram region) have similar luminosity values, hence can be characterized as "flat". A scattered histogram, on the other hand, is more likely to represent texture or details. The inverse relation between the Score and the Diff value encourages preference of the input image that best fits the flat region of the histogram.

In accordance with this embodiment, following the ghost detection and patch creation based on the luminosity values of the downscaled images, the patch correction is applied on the full sized mixing result of the input images. The correction stage consists of the following stages:

(a) Bounding octagons smoothing—Instead of representing the bounding octagon as a binary image, an 8-bit representation or other less than maximal resolution representation is used and a low pass filter (LPF), e.g., a 7×7 LPF for example, is applied on the bounding octagon in order to smooth the edges of the selected patch. This eventually leads to a smoother blending between the inserted patch and its HDR-driven vicinity. The smooth patch image is denoted as the patch mask. The low pass filter applied may be determined by parameter values.

(b) Upscaling of the smooth patch image back to the full image resolution. The resulting image is denoted as the patch mask, $W_{patch}$.

(c) Blending between the current HDR mixing result (denoted as $HDR_{cur}$) and the selected patch input image (denoted as $I_{patch}$) according to the patch mask as follows:

$$HDR_{out} = (1 - W_{patch}) \cdot HDR_{cur} + W_{patch} \cdot I_{patch}$$

In accordance with this embodiment, at the end of the image fusion stage, the resulting High Dynamic Range image is represented as a linear RGB image with 12 bits per color component. The tone mapping task is to transform the 12-bit representation into an 8-bit representation, beginning at step 1950 of FIG. 19. This stage is needed to allow the image to be presented on common display devices. The main challenge at this stage is to perform intelligent tone mapping that will preserve the perceptual added-value of the image fusion process even in the 8-bit representation.

In PC-based HDR algorithms, the tone mapping stage is usually tailored and optimized per HDR scene and regularly requires human assistance. The described method provides an on-camera, real-time, hardware-based tone mapping solution, which can adaptively change its behavior according to the captured scene characteristics.

While there are many possible techniques for performing tone mapping, the disclosed tone mapping algorithm is based on two distinct transformations which are controlled by pre-defined LUTs:

(a) Global mapping—Performing a gamma-like mapping on the HDR fusion result (still maintaining 12 bits per color component). The mapping is usually the inverse of the degamma operation used at the beginning of the fusion stage of the HDR algorithm. This selection is made since it is preferable to maintain similarity to the colors and atmosphere of the input images.

(b) Local mapping—Performing a non-linear, local mapping that maps a pixel according to its neighbors' average luminosity values into an 8-bit representation per color component. Such a tone mapping operator excels in dynamic range compression while preserving local contrast, while tone mapping operations that use only the pixel information tend to damage the local contrast.

Since the LUTs of these mappings are predefined, a simple way to adaptively change the behavior of the tone mapping stage is to define a family of local mapping LUTs (with a single global mapping LUT) and use a chosen LUT representative for every HDR operation. This however requires some additional heuristics and preprocessing investigation in order to detect in which scenario to use a specific LUT. For example, one may use the luminosity values of the input images in order to identify in which LUT to use.

A more sophisticated solution for the adaptive tone mapping challenge, provided via contrasting embodiments of the present invention, is to perform an on-line alteration of the mappings in order to grasp the entire dynamic range of the scene. Thus, in accordance with these embodiments, an additional global mapping on the luminosity component of the HDR fusion result, right after the gamma transform, is introduced. The additional global transform deviates from the unitary transform (Y=X) in order to allocate additional gray scale levels for more frequent luminosity values. For example, if a dominant portion of the image is bright, more gray scale levels are allocated for bright luminosity levels at the expense of darker luminosity levels. By using this adaptive mapping with a pre-defined gamma LUT and local mapping LUT, one can enjoy similar colors as the original image, adapt the luminosity levels (without affecting the scene colors) with the adaptive mapping, and add flavors to the HDR tone mapping result by defining the local-mapping LUT.

The suggested adaptive tone mapping algorithm contains the following stages:

(a) Constructing a luminosity histogram of HDR image after the gamma LUT transformation. Since this may prove to be computationally expensive, an estimated histogram can be produced by using a combination of histograms of the downscaled input images. The estimated histogram is obtained using the following steps:

(a1) Transforming the three images to the gamma domain, with exposure compensation, where the exposure compensation ensures that the luminosity levels in all the images are aligned:

$$\begin{cases} \tilde{I}_{dark} = I_{dark} \\ \tilde{I}_{medium} = \text{Gamma}\left(DeGamma(I_{medium}) \cdot \frac{ExpVal_{dark}}{ExpVal_{medium}}\right) \\ \tilde{I}_{bright} = \text{Gamma}\left(DeGamma(I_{bright}) \cdot \frac{ExpVal_{dark}}{ExpVal_{bright}}\right) \end{cases}$$

(a2) Calculating a luminosity level histogram for the three images, $\tilde{I}_{dark}, \tilde{I}_{medium}, \tilde{I}_{bright}$; and (a3) Merging the three histograms into a single HDR histogram by using two predefined thresholds: BrightTH and DarkTH—

$$Hist_{HDR}(i) = \begin{cases} Hist_{bright}(i) & i \in [0, BrightTH] \\ Hist_{medium}(i) & i \in [BrightTH + 1, DarkTH - 1] \\ Hist_{dark}(i) & i \in [DarkTH, 255] \end{cases}$$

Where $Hist_{HDR}$ represents the combined histogram and $Hist_{bright}, Hist_{medium}, Hist_{dark}$ represent the histogram of the input images after exposure compensation and gamma-LUT.

(b) Defining a mapping according to the distribution of luminosity values. A wider range of output levels should be given to the most populated regions of the luminosity histogram. One of the most popular techniques for defining such a mapping is known as histogram equalization. Here a similar concept is used:

(b1) Normalizing the histogram, $$p(i) = \frac{Hist_{HDR}(i)}{\sum_j Hist_{HDR}(j)}$$

(b2) Calculating the cumulative distribution function, $$Pr(i) = \sum_{j \le i} p(i)$$

(b3) Defining the mapping as $T(i)=\alpha \cdot Pr(i)+(1-\alpha)\cdot i$
Where $\alpha \in [0,1]$ is a strength factor, which blends between the histogram equalization transform and the unitary transform. The strength factor is useful in cases where the histogram equalization is too aggressive and may result in deterioration of the image quality.

Having thus described several aspects of embodiments of the invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, a radio frequency (RF) link, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A method for detecting local motion between a reference image and a plurality of comparison images, comprising:
   defining a number of luma thresholds that determine a group of reference image luma value ranges in which a particular comparison image is selected, the number corresponding to the number of comparison images;
   defining a difference threshold function that sets threshold values according to luma values of the reference image;
   for each particular comparison image, producing an intermediate detection map denoting local motion between the reference image and the particular comparison image by applying the threshold values on a difference image formed by comparing the reference image and the particular comparison image, wherein the intermediate detection map is based on pixels within a reference image luma value range that corresponds to the particular comparison image; and
   outputting a final detection map that is a union of the intermediate detection maps.

2. The method of claim 1 wherein a relatively lower luma comparison image is selected in relatively higher reference image luma value ranges, and vice-versa.

3. The method of claim 1 wherein the luma threshold value set varies with difference image luma values.

4. The method of claim 1 wherein the intermediate detection map is produced by:
   considering pixels with luma values in the range corresponding to the particular comparison image;
   calculating a standard deviation and a mean of the considered pixels;
   normalizing the considered pixels to have a same standard deviation and a same mean for the reference image and the particular comparison image;
   creating an absolute difference map of the considered pixels; and
   using the difference threshold function on the difference map to identify local motion detections.

5. A system for detecting local motion between a reference image and a plurality of comparison images, comprising:
   a processor that:
   defines a number of luma thresholds that determine a group of reference image luma value ranges in which a particular comparison image is selected, the number corresponding to the number of comparison images;
   defines a difference threshold function that sets threshold values according to luma values of the reference image;
   for each particular comparison image, produces an intermediate detection map denoting local motion between the reference image and the particular comparison image by applying the threshold values on a difference image formed by comparing the reference image and the particular comparison image, wherein the intermediate detection map is based on pixels within a reference image luma value range that corresponds to the particular comparison image; and
   outputs a final detection map that is a union of the intermediate detection maps.

6. The system of claim 5 wherein a relatively lower luma comparison image is selected in relatively higher reference image luma value ranges, and vice-versa.

7. The system of claim 5 wherein the luma threshold value set varies with difference image luma values.

8. The system of claim 5 wherein the intermediate detection map is produced by:
- considering pixels with luma values in the range corresponding to the particular comparison image;
- calculating a standard deviation and a mean of the considered pixels;
- normalizing the considered pixels to have a same standard deviation and a same mean for the reference image and the particular comparison image;
- creating an absolute difference map of the considered pixels; and
- using the difference threshold function on the difference map to identify local motion detections.

* * * * *

UNITED STATES PATENT AND TRADEMARK OFFICE
CERTIFICATE OF CORRECTION

PATENT NO. : 8,570,396 B2
APPLICATION NO. : 13/091068
DATED : October 29, 2013
INVENTOR(S) : Rapaport It is certified that error appears in the above-identified patent and that said Letters Patent is hereby corrected as shown below:

On the Title Page, item (56), under "OTHER PUBLICATIONS", in Column 2, Line 1, delete "Shiclian" and insert -- Shiqian --, therefor.

On Title Page 2, item (56), under "OTHER PUBLICATIONS", in Column 1, Line 9, delete "Visualizaton" and insert -- Visualization --, therefor.

On Title Page 2, item (56), under "OTHER PUBLICATIONS", in Column 1, Line 11, delete "Dynammic" and insert -- Dynamic --, therefor.

In the Drawings:

In Fig. 4A, Sheet 5 of 21, delete " 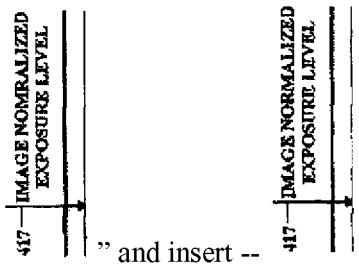 " and insert -- -- , therefor.

In the Specification:

In Column 4, Line 21, delete "value" and insert -- value. --, therefor.

In Column 10, Line 12, delete "DESCRIPTION" and insert -- DETAILED DESCRIPTION --, therefor.

Signed and Sealed this
Seventeenth Day of June, 2014

Michelle K. Lee
*Deputy Director of the United States Patent and Trademark Office*

In Column 13, Line 60, delete "Second Image image" and insert -- Second Image digital image --, therefor.

In Column 18, Lines 62-63,
delete "$Dm1=Max((ABS(Luma(HDR_{2nd\ processed})-Luma(HDR_{ref})))$" and
insert -- $Dm1=Max(ABS(Luma(HDR_{2nd\ processed})-Luma(HDR_{ref})))$ --, therefor.

In Column 19, Line 15, delete "End" and insert -- End. --, therefor.

In Column 24, Line 23, delete "LUT," and insert -- LUT; --, therefor.

In Column 24, Line 25, delete "LUT" and insert -- LUT. --, therefor.

In Column 29, Line 67, delete "region. i.e.:" and insert -- region, i.e.: --, therefor.

In Column 32, Line 47, delete "and" and insert -- and, --, therefor.